(12) United States Patent
Alidedeoglu et al.

(10) Patent No.: US 10,087,323 B2
(45) Date of Patent: Oct. 2, 2018

(54) HYDROSTABILITY OF POLYCARBONATE POLYBUTYLENE TEREPHTHALATE COMPOSITION

(71) Applicant: SABIC INNOVATIVE PLASTICS IP B.V., Bergen Op Zoom (NL)

(72) Inventors: Husnu Alp Alidedeoglu, Evansville, IN (US); Tianhua Ding, Newburgh, IN (US); Ganesh Kannan, Evansville, IN (US)

(73) Assignee: SABIC Global Technologies B.V., Pittsfield, MA (US)

( * ) Notice: Subject to any disclaimer, the term of this patent is extended or adjusted under 35 U.S.C. 154(b) by 0 days.

(21) Appl. No.: 13/950,955

(22) Filed: Jul. 25, 2013

(65) Prior Publication Data
US 2014/0031456 A1    Jan. 30, 2014

Related U.S. Application Data

(60) Provisional application No. 61/677,231, filed on Jul. 30, 2012.

(51) Int. Cl.
| | |
|---|---|
| *C08F 299/04* | (2006.01) |
| *C08L 67/02* | (2006.01) |
| *C08G 63/85* | (2006.01) |
| *C08K 5/103* | (2006.01) |
| *C08K 5/372* | (2006.01) |
| *C08L 69/00* | (2006.01) |
| *C08J 11/16* | (2006.01) |
| *C08J 11/24* | (2006.01) |

(Continued)

(52) U.S. Cl.
CPC ............ *C08L 67/02* (2013.01); *C08G 63/183* (2013.01); *C08G 63/85* (2013.01); *C08J 11/16* (2013.01); *C08J 11/24* (2013.01); *C08K 3/014* (2018.01); *C08K 5/103* (2013.01); *C08K 5/372* (2013.01); *C08L 69/00* (2013.01); *C08J 2367/02* (2013.01); *Y02P 20/582* (2015.11); *Y02W 30/705* (2015.05); *Y02W 30/706* (2015.05)

(58) Field of Classification Search
CPC .... C08L 69/00; C08L 69/005; C08L 2201/08; C08L 2314/08; C08L 2666/38; C08L 2666/78; C08L 17/00; C08K 5/005; C08K 5/36; C08G 63/82; C08G 63/85; C08G 63/87
USPC ....................................... 523/523
See application file for complete search history.

(56) References Cited

U.S. PATENT DOCUMENTS

| | | |
|---|---|---|
| 4,096,156 A | 6/1978 | Freudenberger et al. |
| 4,328,059 A | 5/1982 | Huels et al. |

(Continued)

FOREIGN PATENT DOCUMENTS

| | | | |
|---|---|---|---|
| JP | 60147430 | 8/1985 | |
| WO | WO 2011087141 A1 * | 7/2011 | ............ C08L 69/00 |

*Primary Examiner* — Jane L Stanley
(74) *Attorney, Agent, or Firm* — Honigman Miller Schwartz and Cohn LLP; Heidi M. Berven

(57) ABSTRACT

Disclosed is a process for the manufacture of a modified polyalkylene terephthalate such as modified polybutylene terephthalate. In particular, the process comprises employing a titanium-containing catalyst formed by the reaction product of tetraalkyl titanate and a complexing agent comprising a phosphorous, nitrogen or boron atom. The process is used to prepared modified polyalkylene terephthalates characterized by improved hydrostability, as well as compositions and compositions derived therefrom.

1 Claim, 1 Drawing Sheet

(51) Int. Cl.
*C08G 63/183* (2006.01)
*C08K 3/014* (2018.01)

(56) References Cited

U.S. PATENT DOCUMENTS

| | | |
|---|---|---|
| 4,746,701 A | 5/1988 | Kress et al. |
| 5,266,601 A | 11/1993 | Kyber et al. |
| 5,451,611 A | 9/1995 | Sivaram et al. |
| 6,020,393 A | 5/2000 | Ngo et al. |
| 6,303,738 B1 | 10/2001 | Putzig et al. |
| 6,472,557 B1 | 10/2002 | Pell, Jr. |
| 6,762,235 B2 * | 7/2004 | Takenaka et al. ............ 524/494 |
| 7,129,301 B2 | 10/2006 | Wu et al. |
| 7,799,836 B2 | 9/2010 | Agarwal et al. |
| 7,902,263 B2 | 3/2011 | Agarwal et al. |
| 8,138,233 B2 | 3/2012 | Agarwal et al. |
| 2003/0149223 A1 | 8/2003 | McCloskey et al. |
| 2005/0113534 A1 | 5/2005 | Agarwal et al. |
| 2009/0275698 A1 | 11/2009 | Ravi et al. |
| 2012/0289655 A1 * | 11/2012 | Sumita et al. .................. 525/67 |
| 2013/0018130 A1 | 1/2013 | Alidedeoglu et al. |
| 2013/0018131 A1 | 1/2013 | Alidedeoglu et al. |
| 2013/0018142 A1 | 1/2013 | Alidedeoglu et al. |
| 2013/0018143 A1 | 1/2013 | Alidedeoglu et al. |
| 2013/0053461 A1 | 2/2013 | Alidedeoglu et al. |

* cited by examiner

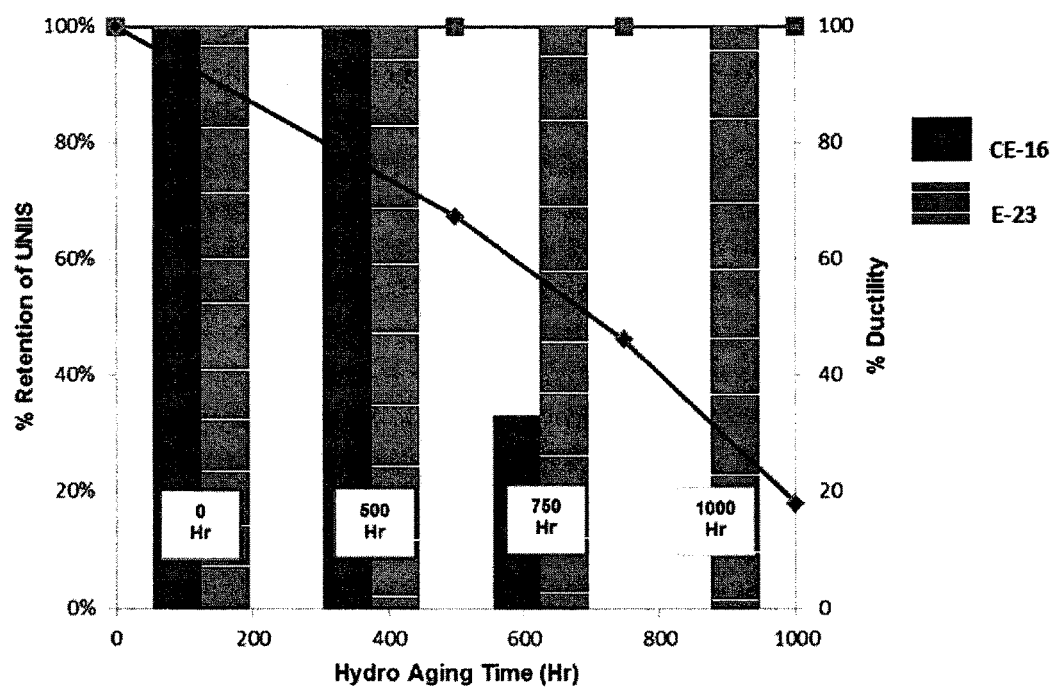

HYDROSTABILITY OF POLYCARBONATE POLYBUTYLENE TEREPHTHALATE COMPOSITION

CROSS REFERENCE TO RELATED APPLICATIONS

This application claims the benefit of U.S. Provisional Patent Application Ser. No. 61/677,231, filed Jul. 30, 2012, which is incorporated herein by reference in its entirety.

TECHNICAL FIELD OF THE INVENTION

Disclosed is a process for the manufacture of a modified polyalkylene terephthalate such as modified polybutylene terephthalate. In particular, the process comprises employing a titanium-containing catalyst formed by the reaction product of tetraalkyl titanate and a complexing agent comprising a phosphorous, nitrogen or boron atom. The process is used to prepare modified polyalkylene terephthalates characterized by improved hydrostability, as well as compositions derived therefrom.

BACKGROUND OF THE INVENTION

Polybutylene terephthalate (PBT) is a well-known semi-crystalline resin that has desirable properties. Compared to amorphous resins such as ABS, polycarbonate, and polystyrene, a crystalline resin like PBT will show much better solvent resistance, higher strength, and higher stiffness due to the presence of crystalline spherulites in the resin. PBT resin is used in many applications where its solvent resistance, strength, lubricity, and rigidity are needed, commonly in durable goods that are formed by injection molding, such as in electronic and communications equipment, computers, televisions, kitchen and household appliances, industrial equipment, lighting systems, gardening and agricultural equipment, pumps, medical devices, food handling systems, handles, power and hand tools, bobbins and spindles, and automotive parts in both under-the-hood and exterior applications. PBT is very widely used to form electrical connectors. Through its many blended products, PBT can be tailored to meet a wide variety of end uses.

Conventional PBT molding compositions generally cannot be made from recycled sources of PBT due to the lack of availability of large supplies of post-consumer or post-industrial PBT scrap materials. Polyethylene terephthalate (PET), unlike PBT, is made in much larger quantities and is more easily recovered from consumer wastes or the like.

With increasing demand for conserving non-renewable resources and for more effectively recycling underutilized scrap PET, improved and less costly processes have been sought for deriving PBT or other polyalkylene terephthalates from scrap PET materials, in particular if the resulting derived polyalkylene terephthalate compositions possess desirable physical properties such as tensile strength, impact strength, and thermal properties.

Polyalkylene terephthalate made from recycled or scrap PET is herein referred to as "modified polyalkylene terephthalate," including "modified PBT," wherein the polymer is modified by containing at least one residue derived from the polyethylene terephthalate component used in the process. The residue can be either incorporated into the structure of the polymer or present in admixture with the resin composition. Thus, the modified polyalkylene terephthalates can identifiably differ slightly from PBT that is not made from scrap PET ("virgin PBT") by such modifications which, however, can be controlled so that the modified PBT has desirable properties comparable or similar to virgin PBT with little or no adverse effects.

Modified polyalkylene terephthalate can generally be made by reacting alkylene diol such as 1,4-butanediol with PET particulates, for example flakes, in the presence of a transesterification catalyst, for instance, as disclosed in U.S. Pat. No. 7,902,263. In general, processes for preparing polyesters by depolymerizing aromatic polyesters in the presence of polyols are known in the art. For example, U.S. Pat. No. 5,451,611 describes a process for converting waste polyethylene terephthalate (PET) to either poly(ethylene-co-butylene terephthalate) or polybutylene terephthalate by reaction with butanediol. Example 11 of U.S. Pat. No. 5,451,611 shows a PBT polymer being formed with a complete replacement of ethylene glycol by butanediol. U.S. Pat. No. 5,266,601 and published U.S. Pat Application 20090275698 (A1) describe a process for making PBT from PET by reacting PET with butanediol.

U.S. Pat. Nos. 7,129,301; 6,020,393; 4,328,059, and United States Publication No. 2005/0113534 disclose various catalysts for the polymerization of polyesters. Tetraalkyl titanates have been most commonly used as catalysts for PBT polymerization. The various titanates can include tetraisopropyl titanate, tetrabutyl titanate, and tetra(2-ethylhexyl) titanate. JP 60147430 discloses a method of producing polyester by esterifying terephthalic acid, adipic acid and 1,4-butanediol in the presence of titanium compound and a pentavalent phosphorus compound. U.S. Pat. No. 6,303,738 B1 discloses a process for producing copolyester containing adipic acid in the presence of TYZOR IAM (available from DuPont), which was prepared through the combination of TPT (tetraisopropyl titanate) and a mixture of butyl phosphate and dibutyl phosphate. These catalysts, however, have not been used for the production of modified polyalkylene terephthalates from PET.

At the end of the polymerization process, the catalyst is typically not quenched (deactivated) in the resin composition. Unfortunately, an active catalyst in the resin composition can sometimes lead to undesirable reactions in subsequent processing of the modified polyalkylene terephthalate to make blends or compositions. On exposure to high temperature and humidity, blends and compositions containing the modified polyalkylene terephthalate can exhibit hydrolytic degradation, especially under caustic conditions. Another problem associated with some blends is transesterification, which can lead to loss of mechanical properties.

Catalyst quenchers such as phosphoric acid can be added to thermoplastic compositions to prevent such transesterification, but they can also promote degradation of polymer chains and contribute to a decrease in polymer molecular weight and greater hydrolytic instability. The use of phosphite stabilizers is less satisfactory because of the tendency for phosphites to be unstable to both hydrolysis and oxidation. Although the use of chain extenders can help to counterbalance the effect of the quencher, it is desirable to eliminate the use of either quencher or chain extender additives as a necessity.

Insufficient hydrostability of modified polyalkylene terephthalate can lead to chain cleavage, the extent of which depends on the exact conditions of exposure to water or humidity. Temperature, time of exposure, and pH are all important. Both acids and bases can catalyze ester hydrolysis. Decomposition of modified polyalkylene terephthalate can be accelerated in aqueous acid or base, or if the polymer matrix of modified polyalkylene terephthalate contains free acid or base additives. Since a reaction product of polyalkylene terephthalate hydrolysis is itself a carboxylic acid, the hydrolytic decomposition of a polyalkylene terephthalate such as PBT is autocatalytic, as depicted in Scheme 1.

Scheme 1

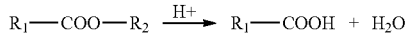

$$R_1\text{—}COO\text{—}R_2 \xrightarrow{H^+} R_1\text{—}COOH + H_2O$$

Thus, a need remains for new and improved catalysts or processes for the production of modified polyalkylene terephthalates that are effective in polymerization, but that do not have adversely impact the properties of the resulting modified polyalkylene terephthalate. There is also a need eliminate the necessity of using either quencher or chain extender additives in preparing modified polyalkylene terephthalates. There is a further need for modified polyalkylene terephthalates with improved properties including hydrostability as well as polymer compositions derived therefrom.

SUMMARY OF THE INVENTION

These and other needs are met by the present invention which is directed to modified polyalkylene terephthalates such as polybutylene terephthalate with improved properties such as hydrostability as well as polymer blends and compositions derived therefrom. The modified polyalkylene terephthalates such as polybutylene terephthalate are prepared by a novel process that employs a catalyst that is the reaction product of a tetraalkyl titanate and a complexing agent. The complexing agent is selected from phosphorus-containing compounds, nitrogen-containing compounds, boron-containing compounds, and combinations thereof. The catalyst, which can be synthesized in-situ, is present during depolymerization of the recycled polyethylene terephthalate starting material, ester interchange with an alkylene diol, and subsequent polymerization of the modified PBT.

This process solves the problem described in the prior art regarding undesirable post-polymerization catalytic activity. In particular, use of an in situ titanium-based catalyst according to the present process can improve hydrolytic stability of the poly(alkylene) terephthalate resin and blends thereof by reducing or eliminating transesterification reactions in later processing, especially in blends susceptible to transesterification. Furthermore, use of the catalyst allows the beneficial exclusion of catalyst quenchers in thermoplastic compositions containing the modified polyalkylene terephthalate resin composition. For example, it is not necessary to add a catalyst quencher compounding or compounding of additives prior to extrusion. Such thermoplastic compositions can, therefore, show improved properties under conditions that can otherwise promote transesterification or hydrolytic degradation of the thermoplastic composition.

Thus, in one aspect, the invention is directed to a hydrostable thermoplastic composition, comprising:

from 10 to 90 percent by weight of a modified polyalkylene terephthalate, wherein the polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and from 10 to 90 percent by weight of a polycarbonate;

wherein all weight percents are based on the total weight of the composition; and wherein no quencher for the catalyst complex is added to the compounded thermoplastic composition.

In another aspect, the invention is directed to a hydrostable thermoplastic composition, comprising:

from 20 to 80 percent by weight of a modified polyalkylene terephthalate, wherein the polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and from 20 to 80 percent by weight of a polycarbonate from 0 to 30 percent by weight of an impact modifier or other polymer; and from 0 to 5 percent by weight of an additive selected from fillers the group consisting of reinforcing agents, anti-oxidants, heat stabilizers, light stabilizers, ultraviolet light (UV) absorbers, plasticizers, lubricants, mold release agents, antistatic agents, colorants, blowing agents, melt strength additives, flame retardants, and anti-drip agents, and combinations thereof; and wherein no quencher for the catalyst complex is added to the compounded thermoplastic composition.

These and other features, aspects, and advantages will become better understood with reference to the following description and appended claims.

BRIEF DESCRIPTION OF THE FIGURES

FIG. 1 shows impact strength and ductility retention as a function of hydroaging time for compositions containing modified PBT.

DETAILED DESCRIPTION OF THE INVENTION

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated.

With respect to the terms "terephthalic acid group" and "isophthalic acid group" ("diacid groups") or "ethylene glycol group," "butanediol group," and "diethylene glycol group" ("diol groups") being used to indicate, for example, the weight percent (percent by weight) of the group in a molecule, the term "isophthalic acid group(s)" means the group or residue of isophthalic acid having the formula (—O(CO)$C_6H_4$(CO)—), the term "terephthalic acid group" means the group or residue of isophthalic acid having the formula (—O(CO)$C_6H_4$(CO)—), the term "diethylene glycol group" means the group or residue of diethylene glycol having the formula (—O($C_2H_4$)O($C_2H_4$)—), the term "butanediol group" means the group or residue of butanediol having the formula (—O($C_4H_8$)—), and the term "ethylene glycol group" means the group or residue of ethylene glycol having the formula (—O($C_2H_4$)—).

The terms "recycle" and "recycled" as used herein refer to any component that has been manufactured and either used or intended for scrap. Thus, a recycle polyester can be polyester that has been used, for example in drinking bottle, or that is a byproduct of a manufacturing process, for example that does not meet a required specification and therefore would otherwise be discarded or scrapped. Recycle materials can therefore contain virgin materials that have not been utilized.

The prefix "bio-" or "bio-derived" as used herein means that the compound or composition is ultimately derived from a biomass or biological source, e.g., "bio-1,3-propane diol" is derived from a biological (e.g., plant or microbial source) rather than a petroleum source. Similarly, the prefix "petroleum-" or "petroleum-derived" means that the compound or composition is ultimately derived from a petroleum source, e.g., a "petroleum-derived polyethylene terephthalate is derived from reactants that are themselves derived from petroleum.

The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols and monomers used to make diols. Biomass based butane diol can be obtained from several sources. For instance, the following process can be used to obtain biomass-based 1,4-butane diol. Agriculture based biomass, such as corn, can be converted into succinic acid by a fermentation process that also consumes carbon dioxide. Such succinic acid is commercially available from several sources such as from Diversified Natural Products Inc. under the trade name BioAmber™. This succinic acid can be easily converted into 1,4-butane diol by processes described in several published documents such as in U.S. Pat. No. 4,096,156, incorporated herein in its entirety. Another process that describes converting succinic acid into 1,4-butane diol is described in Life Cycles Engineering Guidelines, by Smith et al., as described in EPA publication EPA/600/R-1/101 (2001).

"Modified polyalkylene terephthalate," including "modified PBT," means a polyalkylene terephthalate made from recycled or scrap PET. The polymer is modified in that it contains at least one residue derived from the polyethylene terephthalate component used in the process.

The term "contain" as it refers to a modified polyalkylene terephthalate containing the catalyst described herein, means that the catalyst, which can be synthesized in-situ, is present during depolymerization of the polyethylene terephthalate starting material, ester interchange with an alkylene diol, and subsequent polymerization of the modified terephthalate, so that the catalyst is present in the isolated modified polyalkylene terephthalate product.

In this application, parts per million (ppm) as relating, for instance to ppm of tetra($C_1$-$C_8$ alkyl) titanate and ppm of a phosphorous containing compound in the modified polyalkylene terephthalate or compositions derived therefrom, is based on the total amount of titanium contained in the modified polyalkylene terephthalate.

In this application, the phrase "wherein no quencher for the catalyst complex is added to the compounded thermoplastic composition" means that no quencher is added to the thermoplastic composition.

Unless otherwise specified, amounts are indicated in percents by weight based on the total weight of the composition.

Process

The invention described herein is based on the discovery that it is possible to produce modified polyalkylene terephthalate from polyethylene terephthalate feedstock (including recycled polyethylene terephthalate or "scrap" polyethylene terephthalate) and a selected group of diols in the presence of a novel titanium-containing catalyst complex comprising the reaction product of a tetraisopropyl titanate with a complexing agent selected from the group consisting of phosphorus-containing compounds, nitrogen-containing compounds, boron-containing compounds, and combinations thereof.

The process of preparing a modified polyalkylene terephthalate, by melt polycondensation, comprises reacting an alkylene diol and polyethylene terephthalate, wherein polymerization occurs in the presence of a catalyst complex formed by reaction of a tetra($C_1$-$C_8$ alkyl) titanate such as tetraisopropyl titanate and a complexing agent selected from phosphorus-containing compounds, nitrogen-containing compounds, boron-containing compounds, and combinations thereof. The catalyst can be synthesized in situ, prior to depolymerization of the polyethylene terephthalate, by adding the components of the catalyst to a solution comprising alkylene diol used in the process. At least 90 mol %, specifically at least 95 mol %, more specifically at least 98 mol % of the diacid groups in the modified polyalkylene terephthalate are terephthalic acid groups.

The titanium catalyst comprises the reaction product of a tetra($C_1$-$C_8$ alkyl) titanate such as tetraisopropyl titanate and a reactant selected from:

(1) phosphorus-containing compounds, at a molar ratio of the phosphorus-containing compound:titanate from 0.05:1 to less than or equal to 1.2:1, specifically 0.2:1 to 1.2:1, more specifically 0.3:1 to 1.2:1, most specifically 0.5:1 to 1.2:1, (2) nitrogen-containing compounds, at a molar ratio of the nitrogen-containing compound:titanate from 0.05:1 to less than or equal to 1.2:1, specifically 0.2:1 to 1.2:1, more specifically 0.3:1 to 1.2:1, most specifically 0.5:1 to 1.2:1, (3) boron-containing compounds, at a molar ratio of the boron-containing compound:titanate from 0.05:1 to less than or equal to 1.2:1, specifically 0.2:1 to 1.2:1, more specifically 0.3:1 to 1.2:1, most specifically 0.5:1 to 1.2:1, and (4) combinations thereof.

Phosphorus-containing compounds include phosphoric acid, poly(phosphoric acid), phosphorous acid, monoalkyl phosphates such as monobutyl phosphate, dialkyl phosphates dibutyl phosphate, and combinations thereof.

Nitrogen-containing compounds include alkyl amines, aromatic amines, alkyl aromatic amines, alkanol amines, ammonium compounds, and combinations thereof.

Boron-containing compounds include boric acid, boron alkoxides, boric oxides, boron halides, metaborates, monoalkyl borates, dialkyl borates, trialkyl borates, borazines, and combinations thereof.

In regard to these complexing agents, alkyl groups specifically can be $C_1$ to $C_8$, specifically $C_2$ to $C_6$ alkyl groups, more specifically $C_3$ to $C_5$ alkyl groups.

In one embodiment, the titanium-containing catalyst comprises the reaction product of tetra($C_1$-$C_8$ alkyl) titanate, specifically tetraisopropyl titanate, and a phosphorous-containing compound, specifically phosphoric acid, at a molar ratio of the phosphorous-containing compound:tetra($C_1$-$C_8$ alkyl) titanate, specifically at a molar ratio of phosphorous acid:tetraisopropyl titanate from 0.2:1 to 0.9:1 and more specifically at a molar ratio of 0.6:1 to 0.9:1. Modified polybutylene terephthalate of good quality and properties can be produced with this catalyst, in which the properties are similar to, or essentially the same, virgin polybutylene terephthalate.

In particular, the present process can comprise forming a catalyst in situ by combining a tetra($C_1$-$C_8$ alkyl) titanate such as tetraisopropyl titanate with a complexing agent such as phosphoric acid, and an alkylene diol, prior to addition of the polyethylene terephthalate starting material. The catalyst solution can be heated to an elevated first temperature.

The catalyst solution can be combined with polyethylene terephthalate, optionally with further alkylene diol, to obtain a catalyzed reactant mixture. The catalyzed reactant mixture can be subjected to heat to obtain substantially complete depolymerization and ester interchange at an elevated second temperature, typically in the range of 170-230° C., specifically 180 to 220° C., which is typically higher than the first temperature. Such depolymerization can be carried out at a pressure of at least about atmospheric pressure under an inert atmosphere, for example, under nitrogen.

Specifically, in the preparation of modified polybutylene terephthalate, the polyethylene terephthalate component can be reacted with 1,4-butane diol under inert atmosphere and under conditions that are sufficient to depolymerize the polyethylene terephthalate component into a molten mixture containing oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, and/or the like. Polyester moieties and the 1,4-butane diol can be combined in the molten phase under agitation, and the 1,4-butane diol can be continuously refluxed back into the reactor during depolymerization. In one embodiment, 1,4-butane diol is refluxed back into the reactor during depolymerization while excess butanediol, ethylene glycol and tetrahydrofuran are removed during or after depolymerization.

The polyethylene terephthalate component and the 1,4-butane diol component can be combined under atmospheric pressure. In another embodiment, however, it is possible to use pressures that are higher than atmospheric pressures. For instance, in one embodiment, the pressure under which the polyethylene terephthalate component and the 1,4-butane diol are subjected is 2 atmospheres or higher.

The temperature at which the polyethylene terephthalate component and the 1,4-butane diol component are combined and reacted is sufficient to promote depolymerization of the polyethylene terephthalate component into polyethylene terephthalate and polybutylene terephthalate oligomers, 1,4-butane diol, and ethylene glycol. The 1,4-butane diol is generally used in excess amount relative to the polyethylene terephthalate, for example recycled PET scrap. In one embodiment, 1,4-butane diol is used in a molar excess amount ranging from 2 to 20 mol %.

The duration of the time in which recycled PET reacts with 1,4-butane diol can vary, depending on factors, such as available equipment, production needs, desired final properties, and the like. In one embodiment, the depolymerization is carried out for at least 30 minutes. In another embodiment, it is carried out for about 2 to 5 hours.

Once a molten mixture forms, the molten mixture can be placed in subatmospheric pressure conditions at a suitable temperature for a period of time that is sufficiently long for the molten mixture to polymerize into a PET-derived modified PBT polymer.

The subatmospheric conditions can include a pressure of less than 2 Torr, specifically less than 1 Torr. Advantageously, the molten mixture can be placed under subatmospheric conditions without isolation and dissolution of any material from the molten mixture. The temperature at which the molten mixture is placed under subatmospheric conditions is sufficiently high to promote polymerization of the polyethylene terephthalate and polybutylene terephthalate oligomers, 1,4-butane diol, and ethylene glycol to the PET-derived modified PBT ("elevated temperature"). Generally, the temperature is at least 220° C. In one embodiment, the temperature ranges from 220° C. to 275° C., specifically 240° C. to 270° C.

During the time when the molten mixture is placed under subatmospheric conditions and the temperature is increased, excess butanediol, ethylene glycol and THF can be removed from the reactor and oligomers allowed to build up molecular weight. Agitation can be continuously provided to facilitate the removal of the low boiling components. After sufficient molecular weight is obtained, the molten PBT polymer can be dropped from the reactor, cooled, stranded and chopped into pellets.

The duration of polymerization, discussed above (in which the molten mixture polymerizes from polyethylene terephthalate and polybutylene terephthalate oligomers, 1,4-butane diol, and ethylene glycol) can vary, depending on factors such as equipment available, production needs, desired final properties, and the like. In one embodiment, polymerization is carried out for at least two hours. In another embodiment, the step is carried out for at least 30 minutes, specifically from 2 to 5 hours.

The process for making a PET-derived modified PBT component can include reducing the amount of THF produced during the process by adding to the reactor, during polymerization, a basic compound, containing an alkali metal, or an epoxide. Such methods are disclosed in co-assigned U.S. Pat. Nos. 8,138,233 and 7,799,836, both hereby incorporated by reference in their entirety.

The process for making the PET-derived modified PBT may contain an additional stage in which the modified PBT formed from the molten mixture is subjected to solid-state polymerization. In one embodiment, polymerization of the molten depolymerized mixture is carried out under vacuum by subjecting the depolymerized mixture to vacuum under heat, optionally with distillation, at a pressure of less than 2 Torr and a temperature of 220° C. to 270° C. until an intrinsic viscosity of 0.4 to 0.6 is obtained and then initiating solid state polymerization at a temperature of 200° C. to 220° C.

Solid-state polymerization generally involves subjecting the modified PBT formed from the molten mixture to an inert atmosphere and heating to a temperature for a sufficient period of time to build the molecular weight of the modified PBT. Generally, the temperature to which the PBT is heated is below the melting point of the modified PBT, e.g., from 5° C. to 60° C. below the melting point of the PBT. In one embodiment, such a temperature may range from 150° C. to 210° C. Suitable periods of time during which the solid-state polymerization occurs may range from 2 to 20 hours, depending on the conditions and equipment. The solid-state polymerization is generally carried out under tumultuous conditions sufficient to promote further polymerization of the modified PBT to a suitable molecular weight. Such tumultuous conditions may be created by subjecting the modified PBT to tumbling, the pumping of inert gas into the system to promote fluidization of polymer particle, e.g., pellets, chips, flakes, powder and the like. The solid-state polymerization can be carried out at atmospheric pressure and/or under reduced pressure, e.g. from 1 atmosphere to 1 mbar.

By way of illustration, a titanium-containing catalyst can be made in accordance with the present process by reacting in situ a tetra($C_1$-$C_8$ alkyl) titanate such as tetraisopropyl titanate with a phosphorous-containing compound such as phosphoric acid, as shown in Scheme 2.

components and the polyethylene terephthalate can be introduced into a reactor and the reaction temperature can be increased, for example to 220° C., to complete depolymerization and ester interchange, followed by polymerization, for example at 250° C.

In still another embodiment, the invention includes a process for making PTT (polytrimethylene terephthalate) that involves reacting a polyethylene terephthalate component with a 1,3-propanediol at a pressure that is at least atmospheric pressure in the presence of a catalyst component at a temperature ranging from 180° C. to 260° C., under an inert atmosphere, thereby depolymerizing the polyethylene terephthalate component into a molten mixture containing polyethylene terephthalate oligomers, polypropylene terephthalate oligomers, 1,3-propanediol, and ethylene glycol and/or combinations thereof. The polyethylene terephthalate component and the 1,3-propanediol can be combined in the molten phase under agitation and the 1,3 propanediol refluxed back into the reactor, thereby forming a PET-derived PTT.

The polyethylene terephthalate (PET) component of the process includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid (an aliphatic polyester), and other contaminants.

The process of preparing the polyalkylene terephthalate can be either a two-stage process in which the alkylene diol incorporated into the polyalkylene terephthalate is added for both the depolymerization and polymerization stages. Alter-

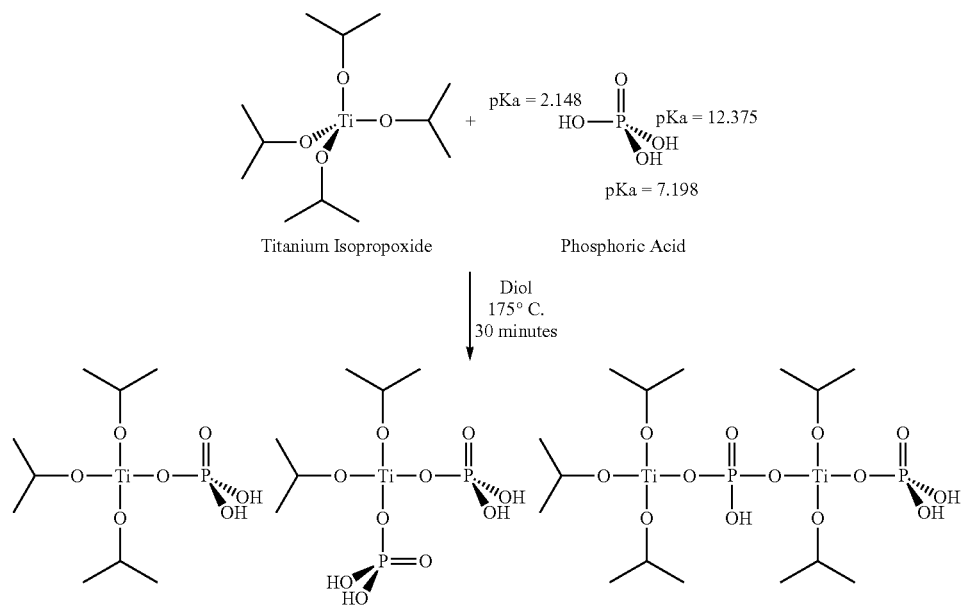

The in-situ reaction between phosphoric acid and tetraisopropyl titanate in diol solvent (for example, butanediol) can achieve complete conversion in the reaction between the most acidic hydroxyl group of the phosphoric acid and tetraisopropyl titanate. Without wishing to be bound by theory, it is believed that once all strongly acidic hydroxyl groups are consumed, polymerization can be conducted without inhibition. After the catalyst preparation, the catalyst natively, a three-stage process in which in which a first dihydric alcohol is used for depolymerization and a second dihydric alcohol, wherein the first dihydric alcohol and second dihydric alcohol are different, is used for polymerization and incorporated into the polyalkylene terephthalate.

For example, in a three-stage process, the first dihydric alcohol can be any $C_2$-$C_4$ alkylene diol that reacts with the PET to depolymerize the polyethylene terephthalate.

Examples of suitable first dihydric alcohols are alkylene diols that can include ethylene glycol, 1,2-propylene glycol, 1,3-propylene glycol, 1,2-butanediol, 2,3-butanediol, 1,4-butanediol, and combinations thereof. In one embodiment, the first dihydric alcohol is selected from 1,4-butanediol, 1,3-propanediol, ethylene glycol, and combinations thereof.

The second dihydric alcohol can be any $C_3$-$C_4$ alkylene diol that reacts with the product of depolymerization in the polymerization of the polyalkylene terephthalate. Examples of a suitable second dihydric alcohol can include 1,2-propylene glycol, 1,3-propylene glycol, 1,2-butanediol, 2,3-butanediol, and 1,4-butanediol, For example, the first alkylene diol can be 1,4-butanediol, 1,3-propanediol, ethylene glycol, or combinations thereof and the second alkylene diol can be diethylene glycol, 1,3-propanediol, 1,4-butanediol, or combinations thereof. In one embodiment of the process, the first dihydric alcohol and the second alkylene diol are different. For example, the first dihydric alcohol can be one or more alkylene diols that do not comprise butanediol and the second dihydric alcohol can be 1,4-butanediol.

For example, in a two-stage process of preparing a modified PBT, a 1,4-butane diol component can react with a polyethylene terephthalate starting material under conditions that depolymerize the polyethylene terephthalate, and a molten mixture of the depolymerized product can be placed under subatmospheric conditions to produce the modified polybutylene terephthalate random copolymer. In a three-stage reaction of preparing a modified PBT, a diol component selected from the group consisting of ethylene glycol, propylene glycol, and combinations thereof can react with a polyethylene terephthalate component under conditions sufficient to depolymerize the polyethylene terephthalate component into a first molten mixture; and the first molten mixture can be combined with 1,4-butane diol under conditions that creates a second molten mixture that is subsequently placed under subatmospheric conditions to produce a modified polybutylene terephthalate random copolymer.

The final modified polyalkylene terephthalate prepared by the process can be a modified poly(trimethylene terephthalate) derived from petroleum-derived 1,3-propanediol, a modified poly(trimethylene terephthalate) derived from bio-derived 1,3-propanediol, a modified polybutylene terephthalate derived from petroleum-derived 1,4-butanediol, or a modified polybutylene terephthalate derived from bio-derived 1,4-butanediol. The content of aromatic acid groups (in particular isophthalic acid groups and terephthalic acid groups) in the polyalkylene terephthalate can vary depending on the PET used and the reaction conditions. In one embodiment the aromatic dicarboxylic acid group contains from 0.2 to 3.0 mol % of isophthalic acid group and from 90 to 99 mol % percent of terephthalic acid groups, based on the total moles of diacid groups present in the copolymer. Specifically, at least 90 mol %, specifically at least 95 mol %, more specifically at least 98 mol % or about 0 mol %, of the diacid groups in the modified polyalkylene terephthalate (specifically modified polybutylene terephthalate) are terephthalic acid, or terephthalic acid groups and isophthalic acid groups, derived from the polyalkylene terephthalate. Specifically, at least 90 mol %, specifically at least 95 mol %, more specifically at least 98 mol % or about 0 mol %, of the diol groups in the modified polyalkylene terephthalate (specifically modified polybutylene terephthalate) are an alkylene diol group derived from the dihydric alcohol used in polymerizing the modified polyalkylene terephthalate.

The modified polyalkylene terephthalate prepared by the present process comprises the components of the titanium-containing catalyst. Thus, the modified polyalkylene terephthalate prepared by the present process comprises 50 to 300 ppm of tetra($C_1$-$C_8$ alkyl) titanate and 100 to 600 ppm of a phosphorous containing compound selected from the group consisting of phosphoric acid, poly(phosphoric acid), phosphorus acid, monobutyl phosphate, dibutyl phosphate, monoalkyl phosphates, dialkyl phosphates. More specifically, the modified polyalkylene terephthalate prepared by the present process is modified PBT, which comprises 50 to 300 ppm of tetraisopropyl titanate and 100 to 600 ppm of phosphoric acid.

The modified polyalkylene terephthalate prepared by the present process can further comprise other residues present in the PET component, including catalyst residues from the manufacture of the PET, residues from additives in the PET, or residues arising from side reactions that occur during manufacture of the PET and/or the reaction of the first alkylene diol and the PET.

For example, residues derived from the polyethylene terephthalate component can include ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline salts, alkaline earth metal salts, phosphorus-containing compounds and anions, sulfur-containing compounds and anions, naphthalene dicarboxylic acids, 1,3-propanediol groups, or combinations thereof. In one embodiment, the residue derived from the polyethylene terephthalate component can comprise one or more of ethylene glycol groups, diethylene glycol groups, and more particularly a combination of ethylene glycol groups and diethylene glycol groups.

The amount of the ethylene glycol groups, diethylene glycol groups, and the isophthalic groups in the polymeric backbone of the modified PBT component can vary. The PET-derived modified PBT component ordinarily contains isophthalic acid groups in an amount that is at least 0.1 mol % and can range from 0 or 0.1 to 10 mol % (0 or 0.07 to 7 percent by weight). The PET-derived modified PBT component ordinarily contains ethylene glycol in an amount that is at least 0.1 mol % and can range from 0.1 to 10 mole %. (0.02 to 2 wt. %). In one embodiment, the PET-derived modified PBT component has an ethylene glycol content that is more than 0.85 wt. %. The modified PBT component can also contain diethylene glycol in an amount ranging from 0.1 to 10 mol % (0.04 to 4 wt. %). The amount of the butane diol groups is generally about 98 mol % and can vary from 95 to 99.8 mol % in some embodiments. The amount of the terephthalic acid groups is generally about 98 mol % and can vary from 90 to 99.9 mole % in some embodiments. Unless otherwise specified, all molar amounts of the isophthalic acid groups and or terephthalic acid groups in a polyester are based on the total moles of diacids/diesters in the composition. Unless otherwise specified, all molar amounts of the butane diol, ethylene glycol, and diethylene glycol groups are based on the total moles of diol in the composition.

The polyalkylene terephthalate prepared by the present process is a random polymer that can have a number average molecular weight of at least 10,000 g/mol, specifically at least 15,000 g/mol, and a polydispersity index from 2 to less than 6, specifically 2 to 5. In one embodiment, the modified polyalkylene terephthalate, specifically a modified PBT, has a melting temperature ($T_m$) ranging from 150 to 223° C., specifically 200 to 218° C., more specifically 204 to 210° C.

Specifically, recycled polyethylene terephthalate for use in the present process can be selected or characterized by any one or more, specifically all, of the following: an acetaldehyde content below 5 ppm, a moisture content below 0.5 percent by weight, a halogen (specifically Br and Cl) content below 10 ppm, an iron content less than 10 ppm, a DEG or isophthalate content less that 5 percent by weight, —COOH end groups in an amount below 70 meq/Kg resin, —OH end groups in an amount greater than 30 meq/Kg, a vinyl content less than 0.1%, and a PVC or PC content essentially absent (less that 10 ppm). The resulting product can be obtained and characterized by any one or more, specifically all, of the following: a $M_w$ of 10,000 to 70,000 (or IV of 0.4 to 0.9 dl/g), —COOH end groups in the amount of 5 to 40 meq/Kg resin, OH end groups in the amount of 10 to 70 meq/Kg resin, a Yellowness Index (YI) of 5.0 to 15.0, a phosphorous (P) content of 50 to 1000 ppm, a titanium (Ti) content of 10 to 200 ppm, a mole ratio of P to Ti of 4:1 to 1:1, cobalt in the amount of 10 to 100 ppm, and a DEG content in the polymer of 0.50 to 3.0 mole %.

In the present process, the final polyalkylene terephthalate can be a modified poly(trimethylene terephthalate) derived from petroleum-derived 1,3-propanediol, a modified poly(trimethylene terephthalate) derived from bio-derived 1,3-propanediol, a modified polybutylene terephthalate derived from petroleum-derived 1,4-butanediol, or a modified polybutylene terephthalate derived from bio-derived 1,4-butanediol. The content of aromatic acid groups (in particular isophthalic acid groups and terephthalic acid groups) in the polyalkylene terephthalate can vary depending on the PET used and the reaction conditions. In one embodiment the aromatic dicarboxylic acid group contains from 0.2 to 3.0 mol % of isophthalic acid group and from 90 to 99 mol % percent of terephthalic acid groups, based on the total moles of diacid groups present in the copolymer. Specifically, at least 90 mol %, specifically at least 95 mol %, more specifically at least 98 mol % or about 0 mol %, of the diacid groups in the modified polyalkylene terephthalate (specifically modified polybutylene terephthalate) are terephthalic acid, or terephthalic acid groups and isophthalic acid groups, derived from the polyalkylene terephthalate. Specifically, at least 90 mol %, specifically at least 95 mol %, more specifically at least 98 mol % or about 0 mol %, of the diol groups in the modified polyalkylene terephthalate (specifically modified polybutylene terephthalate) are an alkylene diol group derived from the dihydric alcohol used in polymerizing the modified polyalkylene terephthalate.

The polyalkylene terephthalate prepared by the present process can further comprise other residues present in the PET component, including catalyst residues from the manufacture of the PET, residues from additives in the PET, or residues arising from side reactions that occur during manufacture of the PET and/or the reaction of the first alkylene diol and the PET.

For example, residues derived from the polyethylene terephthalate component can include ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline salts, alkaline earth metal salts, phosphorus-containing compounds and anions, sulfur-containing compounds and anions, naphthalene dicarboxylic acids, 1,3-propanediol groups, or combinations thereof. In one embodiment, the residue derived from the polyethylene terephthalate component can comprise one or more of ethylene glycol groups, diethylene glycol groups, and more particularly a combination of ethylene glycol groups and diethylene glycol groups.

The amount of the ethylene glycol groups, diethylene glycol groups, and the isophthalic groups in the polymeric backbone of the modified PBT component can vary. The PET-derived modified PBT component ordinarily contains isophthalic acid groups in an amount that is at least 0.1 mol % and can range from 0 or 0.1 to 10 mol % (0 or 0.07 to 7 percent by weight). The PET-derived modified PBT component ordinarily contains ethylene glycol in an amount that is at least 0.1 mol % and can range from 0.1 to 10 mol % (0.02 to 2 wt. %). In one embodiment, the PET-derived modified PBT component has an ethylene glycol content that is more than 0.85 wt. %. The modified PBT component can also contain diethylene glycol in an amount ranging from 0.1 to 10 mol % (0.04 to 4 wt. %). The amount of the butane diol groups is generally about 98 mol % and can vary from 95 to 99.8 mol % in some embodiments. The amount of the terephthalic acid groups is generally about 98 mol % and can vary from 90 to 99.9 mole % in some embodiments. Unless otherwise specified, all molar amounts of the isophthalic acid groups and or terephthalic acid groups in a polyester are based on the total moles of diacids/diesters in the composition. Unless otherwise specified, all molar amounts of the butane diol, ethylene glycol, and diethylene glycol groups are based on the total moles of diol in the composition.

Advantageously, the present process for making PET-derived modified polyalkylene terephthalate can substantially reduce carbon dioxide emissions and solid waste. Since the modified polyalkylene terephthalate resin compositions made by the inventive process can be made from scrap PET and not monomers, the process can significantly reduce the amount of carbon dioxide emissions and solid waste. In contrast, the process to make DMT or TPA from crude oil is highly energy intensive and as a result, substantial emissions of $CO_2$ to the atmosphere can occur from burning of non-renewable energy sources. By not using DMT or TPA to make the PET-derived PBT, substantial carbon dioxide emissions savings can be obtained.

In one embodiment, a process for making PET-derived modified PBT can eliminate at least 1 kg of $CO_2$ emissions for every kilogram of PET-derived modified PBT made with the process, as compared to a process that makes virgin PBT homopolymers from monomers. Specifically, the process for making PET-derived modified PBT can eliminate from 1 kg to 1.5 kg, or more $CO_2$ emissions for every kilogram of PET-derived modified PBT made with the inventive process, as compared to a process that makes virgin PBT homopolymers from monomers. Additionally, there are energy savings/reduced carbon dioxide emissions when the ethylene glycol byproduct is recovered and is used instead of ordinary ethylene glycol in manufacturing.

Additionally, when the source of butanediol is from biomass derived, feedstocks such as succinic acid, the carbon dioxide savings can further increase. Furthermore, the fermentation to yield succinic acid requires carbon dioxide as an input, therefore leading to further carbon dioxide reductions.

Accordingly, the present process can produce a modified polybutylene terephthalate random copolymer having a reduced $CO_2$ emissions index, defined as the amount of $CO_2$, expressed in kg, that is saved when one kg of a composition containing the modified polybutylene terephthalate random copolymers is made, as compared to the amount of $CO_2$, expressed in kg, that is created when the composition is made with polybutylene terephthalate that is derived from monomers. Generally, the modified PBT random copolymers made by the present process can have a reduction in $CO_2$ emissions index that is more than approximately 1.3 kg and can range from 1.3 kg to 2.5 kg.

In one embodiment, the present process is used to prepare a modified polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof. The modified polyalkylene terephthalate typically has a number average molecular weight of at least 15,000 g/mol, specifically 20,000 to 200,000 g/mol) and a polydispersity index from 2 to less than 6, specifically 2 to 5. In such an embodiment, the modified polyalkylene terephthalate, specifically the modified PBT, has a melting temperature ($T_m$) ranging from 150° C. to 223° C., specifically 200° C. to 218° C., more specifically 204° C. to 210° C. The molecular weight can be obtained using polystyrene standards, as measured by gel permeation chromatography in chloroform/hexafluoroisopropanol (5:95, volume/volume ratio) at 25° C.

In one embodiment, the modified polyalkylene terephthalate is a modified polybutylene terephthalate (PBT) containing 50 to 300 ppm of tetra($C_1$-$C_8$ alkyl) titanate and 100 to 600 ppm of a phosphorous containing compound, both based on the total amount of titanium present, wherein the phosphorous containing compound which is phosphoric acid. The PBT typically has an intrinsic viscosity (as measured in phenol/tetrachloroethane (60:40, volume/volume ratio) at 25° C.) of 0.4 to 2.0 deciliters per gram. In one embodiment, the PBT resin has an intrinsic viscosity of 0.6 to 1.4 dl/g.

The PBT is typically prepared in a pilot plant by reacting polyethylene terephthalate with 1,4-butanediol in the presence of the catalyst described herein. The ratio of the catalyst components (PA:TPT) is typically in the range of 0.15:1 to 0.9:1. The resin is produced via a melt polymerization/solid state polymerization process, wherein melt polymerization involves batch processing (including catalyst preparation), depolymerization, transesterification and polycondensation. Typically a particular IV is targeted for the product obtained from melt polymerization. In one embodiment, the targeted IV is from 0.7-0.9 dL/g. The melt polymerization product is subsequently subjected to solid state polymerization Typically, a particular IV is targeted for the product obtained from solid state polymerization. In one embodiment, the targeted IV is from 1.0-1.3 dL/g.

Melt Polymerization.

More specifically, melt polymerization is carried out in a pilot plant equipped with a single batch reactor, and involves four steps: in-situ catalyst preparation, depolymerization of recycled PET (rPET), ester interchange (EI), and polymerization. First, ethylene glycol (EG) and phosphoric acid (the amount used depends on the titanium catalyst concentration) are charged into the reactor and the reactor temperature is raised to 120° C. at atmospheric pressure (approximately 1050 mbar). The mixture is held at this temperature and atmospheric pressure for 30 minutes to remove moisture. The calculated amount of titanium isopropoxide to achieve a concentration of 115 ppm of Ti based on the polymer weight is then added into the reactor and the reactor temperature is raised to 170° C. The mixture is held at 170° C. for 70 minutes.

Recycled PET (rPET) is then charged into the reactor (rPET:EG=1:1.5 mol). The reactor temperature was then increased to 225° C. and the pressure was set to 3.5 mbar (2.6 Torr). Depolymerization of rPET to bis-hydroxy ethyl terephthalate (BHET) was completed in 90 minutes by holding the mixture at these conditions. After completion of depolymerization, the reactor is depressurized to 1050 mbar (787 Torr). Next, in the transesterification step, BDO (rPET: BDO=1:3.6 mol ratio) is added to the reactor and the reactor temperature is maintained at 225° C. to complete atmospheric distillation until the column top temperature dropped. A vacuum of 700 mbar (525 Torr) is applied gradually in the transesterification step to remove EG while maintaining the reactor temperature at 225° C. for 30 minutes and the overhead line temperature at 180° C. which allows BDO reflux back into the reactor. EG and BDO are collected as overheads during the transesterification step. The batch is held at these conditions until the column top temperature drops to 130° C. In the polymerization step, the reactor temperature is increased to 240° C. and a vacuum is applied by gradually reducing the pressure to approximately 1 mbar (0.757 Torr), to remove excess BDO, THF, and EG as overheads. After stabilizing the vacuum at approximately 1 mbar and the reactor temperature between 240 and 250° C., the torque in the reactor is monitored until achieving the required intrinsic viscosity (IV) (between 0.7 and 0.8 dL/g). Finally, the polymer melt is drained and then pelletized.

Solid State Polymerization.

In order to get a high value of IV (1.17-1.25 dL/g) for the resin prepared from rPET, low viscosity resins obtained from melt polymerization are subjected to solid state polymerization in a tumbling reactor at 100 mbar (75 Torr) pressure at a temperature of 200° C. for about 18 to 30 h. The IV is checked intermittently during the viscosity build-up and a product with a final IV value of 1.25 is obtained.

In another aspect, the invention is directed to a modified polyalkylene terephthalate prepared by from recycled polyethylene terephthalate by a melt polymerization process comprising:

forming a catalyst solution comprising a catalyst that is the reaction product of tetra($C_1$-$C_8$ alkyl) titanate and a phosphorus-containing compound, which catalyst is synthesized in situ, prior to depolymerization of the polyethylene terephthalate, by combining, at an elevated first temperature, the tetra($C_1$-$C_8$ alkyl) titanate and phosphorous-containing compound in butanediol and/or ethylene glycol, wherein the catalyst is formed employing a complexing agent acid: tetraisopropyl titanate molar ratio of 0.1:1 to 1.2:1;

forming a catalyzed reactant mixture by combination the catalyst solution with polyethylene terephthalate, optionally with additional butanediol and/or ethylene glycol, and subjecting the catalyzed reactant mixture to heat to obtain substantially complete depolymerization and ester interchange at an elevated second temperature to form a depolymerized mixture;

subjecting the depolymerized mixture to heat to melt residual particles of polyethylene terephthalate at an elevated third temperature higher than the second temperature to obtain a molten depolymerized mixture;

polymerizing the molten depolymerized mixture under vacuum, in the presence of butanediol added following depolymerization if not before, by subjecting the molten depolymerized mixture to vacuum under heat, optionally with distillation, at a pressure of less than 2 Torr and a temperature of 220° C. to 270° C.; and stopping the polymerization when obtaining a modified polybutylene terephthalate having a number average molecular weight of at least 15,000 g/mol.

In another aspect, the invention is directed to a modified polyalkylene terephthalate prepared by from recycled polyethylene terephthalate by a melt polymerization process comprising:

forming a catalyst solution comprising a catalyst that is the reaction product of tetra($C_1$-$C_8$ alkyl) titanate and a phosphorus-containing compound, which catalyst is synthesized in situ, prior to depolymerization of the polyethylene terephthalate, by combining, at an elevated first temperature, the tetra($C_1$-$C_8$ alkyl) titanate and phosphorous-containing compound in butanediol and/or ethylene glycol, wherein the catalyst is formed employing a complexing agent acid:tetraisopropyl titanate molar ratio of 0.1:1 to 1.2:1;

forming a catalyzed reactant mixture by combination the catalyst solution with polyethylene terephthalate, optionally with additional butanediol and/or ethylene glycol, and subjecting the catalyzed reactant mixture to heat to obtain substantially complete depolymerization and ester interchange at an elevated second temperature to form a depolymerized mixture;

subjecting the depolymerized mixture to heat to melt residual particles of polyethylene terephthalate at an elevated third temperature higher than the second temperature to obtain a molten depolymerized mixture;

polymerizing the molten depolymerized mixture under vacuum, in the presence of butanediol added following depolymerization if not before, by subjecting the molten depolymerized mixture to vacuum under heat, optionally with distillation, at a pressure of less than 2 Torr and a temperature of 220° C. to 270° C.; and subjecting the polymerized mixture to solid state polymerization at approximately 100 mbar (75 Torr) pressure and a temperature of approximately 200° C. for about 18 to 30 h to obtain a modified polybutylene terephthalate.

Compositions

The modified polyalkylene terephthalate resin prepared by the process described herein can be blended with other components to obtain a thermoplastic blends. Additives are ordinarily incorporated into polymer compositions with the understanding that the additives are selected so as to not significantly adversely affect the desired properties of the composition, for example, impact, flexural strength, color, and the like. Such additives can be mixed at a suitable time during the mixing of the components for forming the composition. Possible additives include reinforcing agents, chain extenders, impact modifiers, fillers, reinforcing agents, antioxidants, heat stabilizers, light stabilizers, ultraviolet light (UV) absorbers, plasticizers, lubricants, mold release agents, antistatic agents, colorants, blowing agents, flame retardants, anti-drip agents, nucleating agents, and radiation stabilizers. Additives are described, for instance, in the *Plastics Additives Handbook* Hans Zweifel, Ed. (6*th* ed. 2009).

For example, a thermoplastic composition can include other polymers, in addition to the modified polyalkylene terephthalate prepared by the process disclosed herein. In particular, a modified polyalkylene terephthalate prepared by the process disclosed herein can be blended a polycarbonate.

Thus, in another embodiment, the invention is directed to a thermoplastic composition comprising:

from 10 to 90 percent by weight of a modified polyalkylene terephthalate, wherein the modified polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and from 10 to 90 percent by weight of a polycarbonate;

wherein all weight percents are based on the total weight of the composition; and wherein no quencher for the catalyst complex is added to the compounded thermoplastic composition.

As used herein, the term "polycarbonate" means a composition having repeating structural carbonate units of the Formula (1):

Formula 1 in which the $R^1$ groups are aromatic, aliphatic, or alicyclic organic radicals. In one embodiment, at least 60 percent of the total number of $R^1$ groups are aromatic organic radicals and the balance thereof are aliphatic, alicyclic, or aromatic radicals. In another embodiment, each $R^1$ is an aromatic organic radical, for example a radical of the Formula (2):

$-A^1-Y^1-A^2-$    Formula 2 wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S($O_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene. In one specific embodiment, the polycarbonate is a linear homopolymer derived from bisphenol A, in which each of $A^1$ and $A^2$ is p-phenylene and $Y^1$ is isopropylidene.

Polycarbonates may be produced by the reaction of dihydroxy compounds having the formula HO—$R^1$—OH, wherein $R^1$ is as defined above. Dihydroxy compounds suitable in an interfacial reaction include the dihydroxy compounds of formula (A) as well as dihydroxy compounds of formula (3)

HO-$A^1$-$Y^1$-$A^2$-OH    Formula 3 wherein $Y^1$, $A^1$ and $A^2$ are as described above. Also included are bisphenol compounds of general formula (4):

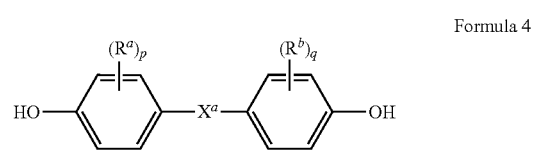

Formula 4 wherein $R^a$ and $R^b$ each represent a halogen atom or a monovalent hydrocarbon group and may be the same or different; p and q are each independently integers of 0 to 4; and $X^a$ represents one of the groups of formula (5):

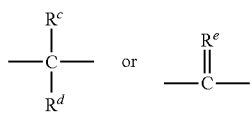

Formula 5 wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobi-indane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used. The polycarbonate copolymers may be made by methods known in the art, such as by the method described in U.S. Application Publication 2003/0149223.

In some embodiments, blends of at least two different polycarbonates are used. In some of these embodiments, blends of at least two polycarbonates having different molecular weights are used. Branched polycarbonate are also useful as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents may be added at a level of 0.05 weight percent to 2.0 weight percent based on 100 percent by weight of the polycarbonate. All types of polycarbonate end groups are contemplated as being useful in the polycarbonate, provided that such end groups do not significantly affect desired properties of the thermoplastic compositions.

Polycarbonates as used herein further include blends of polycarbonates with other copolymers comprising carbonate chain units. A specific suitable copolymer is a "polyester carbonate", also known as a copolyester-polycarbonate. Such "polyester carbonate" copolymers further contain, in addition to recurring carbonate chain units of the formula (1), repeating units of formula (6)

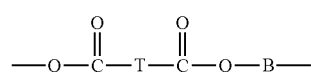

Formula 6 wherein B is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical. As used herein, polyester carbonate means compositions having at least 5 mole percent of carbonate linkages relative to the molar sum of the carbonate and ester linkages.

In one embodiment, B is a $C_{2-6}$ alkylene radical. In another embodiment, B is derived from an aromatic dihydroxy compound of formula (7):

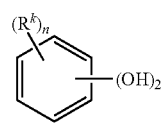

Formula 7 wherein each $R^k$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acid compounds that may be used to prepare the polyester carbonate include isophthalic or terephthalic acid, 1,2-di(p-carboxyphenyl) ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 10:1 to 0.2:9.8. In another specific embodiment, B is a $C_{2-6}$ alkylene radical and T is p-phenylene, m-phenylene, naphthalene, a divalent cycloaliphatic radical, or a mixture thereof. This class of polyester carbonate includes the poly (alkylene terephthalates). Suitable aliphatic dicarboxylic acids include succinic acid, oxalic acid, malonic acid, glutaric acid, adipic acid, pimelic acid, suberic acid, azelaic acid, sebacic acid, undecanoic diacid, dodecanoic diacid, maleic acid and fumaric acid. Rather than utilizing the dicarboxylic acid per se, it is possible, and sometimes even preferred, to employ the reactive derivatives of the acid, such as the corresponding acid halides, in particular the acid dichlorides and the acid dibromides in the interfacial polymerization method or esters such as optionally substituted phenyl esters in the melt polymerization method. Thus, for example, instead of using isophthalic acid, terephthalic acid, or mixtures thereof, it is possible to employ isophthaloyl dichloride, terephthaloyl dichloride, and mixtures thereof.

Suitable polycarbonates can be manufactured by processes such as interfacial polymerization or melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., 8 to 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Among the phase transfer catalysts that can be used are catalysts of the formula $(R^3)_4Q^+X$, wherein each $R^3$ is independently the same or different and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4X$, $[CH_3(CH_2)_5]_4NX$, $[CH_3(CH_2)_6]_4NX$, $[CH_3(CH_2)_4]_4NX$, $CH_3-[CH_3(CH_2)_3]_3NX$, and $CH_3-[CH_3(CH_2)_2]_3NX$, wherein X is Cl⁻, Br⁻, a $C_{1-8}$ alkoxy group or a $C_{6-18}$ aryloxy group. An effective amount of a phase transfer catalyst can be 0.1 to 10 weight percent based on the weight of bisphenol in the phosgenation mixture. In another embodiment an effective amount of phase transfer catalyst can be 0.5 to 2 weight percent based on the weight of bisphenol in the phosgenation mixture. All types of polycarbonate end groups are contemplated as being useful in the thermoplastic composition, provided that such end groups do not significantly adversely affect desired properties of the compositions.

A chain stopper (also referred to as a capping agent) can be included during polymerization to form the polycarbonate. The chain stopper limits molecular weight growth rate, and so controls molecular weight in the polycarbonate. Exemplary chain stoppers include certain mono-phenolic compounds, mono-carboxylic acid chlorides, and/or monochloroformates. Mono-phenolic chain stoppers are exemplified by monocyclic phenols such as phenol and $C_{1-22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_{1-22}$ allyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes may be used to make the polycarbonate. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

Blends and/or mixtures of more than one polycarbonate may also be used. For example, a high flow and a low flow polycarbonate may be blended together. In one embodiment, a blend and/or mixture of linear polycarbonates having a weight average molecular weight relative to polycarbonate standards of less than 31,000 Daltons, specifically between 18,000 and 31,000 Daltons, is used.

In one embodiment, the polycarbonate is a 2,2-bis(4-hydroxyphenyl)propane (bisphenol-A) polycarbonate, commercially available under the trade designation LEXAN.

In another embodiment, the polycarbonate can be a polycarbonate-siloxane copolymer. The polydiorganosiloxane blocks comprise repeating structural units of the formula (sometimes referred to herein as "siloxane"):

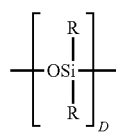

wherein each occurrence of R is same or different, and is a $C_{1-13}$ monovalent organic radical. For example, R may be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-10}$ aryl group, $C_{6-10}$ aryloxy group, $C_{7-13}$ aralkyl group, $C_{7-13}$ aralkoxy group, $C_{7-13}$ alkaryl group, or $C_{7-13}$ alkaryloxy group. Combinations of the foregoing R groups may be used in the same copolymer.

The value of D in

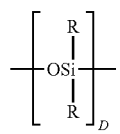

may vary widely depending on the type and relative amount of each component in the thermoplastic composition, the desired properties of the composition, and like considerations. Generally, D may have an average value of 2 to about 1000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of the formula:

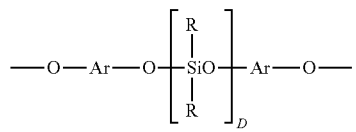

wherein D is as defined above; each R may be the same or different, and is as defined above; and Ar may be the same or different, and is a substituted or unsubstituted $C_{6-30}$ arylene radical, wherein the bonds are directly connected to an aromatic moiety. Suitable Ar groups in this formula may be derived from a $C_{6-30}$ dihydroxyarylene compound, for example a dihydroxyarylene compound of formula $HO-A^1-Y^1-A^2-OH$,

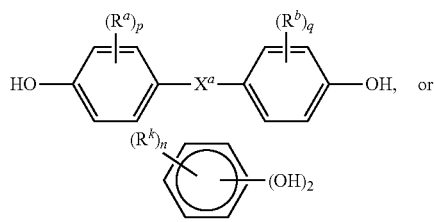

above. Combinations comprising at least one of the foregoing dihydroxyarylene compounds may also be used. Specific examples of suitable dihydroxyarlyene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Such units may be derived from the corresponding dihydroxy compound of the following formula:

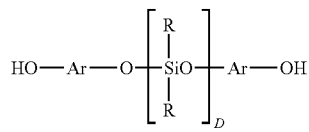

wherein Ar and D are as described above. Such compounds are further described in U.S. Pat. No. 4,746,701 to Kress et al. Compounds of this formula may be obtained by the reaction of a dihydroxyarylene compound with, for example, an alpha,omega-bisacetoxypolydiorangonosiloxane under phase transfer conditions.

In another embodiment the polydiorganosiloxane blocks comprise repeating structural units of the formula:

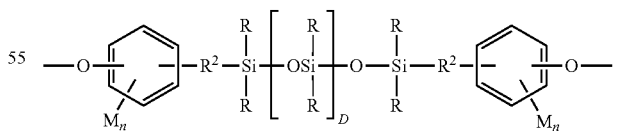

wherein R and D are as defined above. $R^2$ in this formula is a divalent $C_{2-8}$ aliphatic group. Each M in this formula may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkaryl, or $C_{7-12}$ alkaryloxy, wherein each n is independently 0, 1, 2, 3, or 4.

In one embodiment, M is an alkyl group such as methyl, ethyl, or propyl, an alkoxy group such as methoxy, ethoxy, or propoxy, or an aryl group such as phenyl or tolyl; $R^2$ is a dimethylene, trimethylene or tetramethylene group; and R is a $C_{1-8}$ alkyl, cyanoalkyl, or aryl such as phenyl, or tolyl. In another embodiment, R is methyl or a mixture of methyl and phenyl. In still another embodiment, M is methoxy, n is one, $R^2$ is a divalent $C_{1-3}$ aliphatic group, and R is methyl.

These units may be derived from the corresponding dihydroxy polydiorganosiloxane:

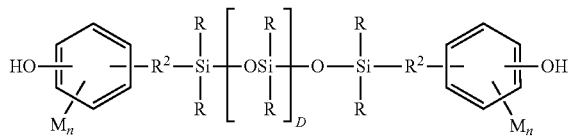

wherein R, D, M, $R^2$, and n are as described above.

Such dihydroxy polysiloxanes can be made by effecting a platinum catalyzed addition between a siloxane hydride of the formula:

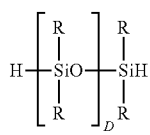

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. Mixtures comprising at least one of the foregoing may also be used.

A polycarbonate-polysiloxane copolymer may be manufactured by reaction of diphenolic polysiloxane with a carbonate source and a dihydroxy aromatic compound, optionally in the presence of a phase transfer catalyst as described above. Suitable conditions are similar to those useful in forming polycarbonates. For example, the copolymers are prepared by phosgenation, at temperatures from below 0° C. to about 100° C., desirably about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above. Siloxane groups may also be present at or attached to the ends of the copolymer as well.

In the production of a polycarbonate-polysiloxane copolymer, the amount of dihydroxy polydiorganosiloxane is selected so as to provide the desired amount of polydiorganosiloxane units in the copolymer. The amount of polydiorganosiloxane units may vary widely, i.e., may be about 1 wt % to about 99 wt % of polydimethylsiloxane, or an equivalent molar amount of another polydiorganosiloxane, with the balance being carbonate units. The particular amounts used will therefore be determined depending on desired physical properties of the thermoplastic composition, the value of D (within the range of 2 to about 1000), and the type and relative amount of each component in the thermoplastic composition, including the type and amount of polycarbonate, type and amount of impact modifier, type and amount of polycarbonate-polysiloxane copolymer, and type and amount of any other additives. Suitable amounts of dihydroxy polydiorganosiloxane can be determined by one of ordinary skill in the art without undue experimentation using the guidelines taught herein. For example, the amount of dihydroxy polydiorganosiloxane may be selected so as to produce a copolymer comprising about 1 wt % to about 75 wt %, or about 1 wt % to about 50 wt % polydimethylsiloxane, or an equivalent molar amount of another polydiorganosiloxane. In one embodiment, the copolymer comprises about 5 wt % to about 40 wt %, optionally about 5 wt % to about 25 wt % polydimethylsiloxane, or an equivalent molar amount of another polydiorganosiloxane, with the balance being polycarbonate. In a particular embodiment, the copolymer may comprise about 20 wt % siloxane.

In specific embodiments, the polycarbonate is derived from a dihydroxy compound having the structure of the Formula:

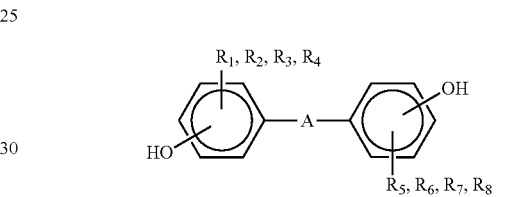

wherein $R_1$ through $R_8$ are each independently selected from hydrogen, halogen, nitro, cyano, $C_{1-20}$ alkyl, $C_{4-20}$ cycloalkyl, and $C_{6-20}$ aryl; and A is selected from a bond, —O—, —S—, —SO$_2$, $C_{1-12}$ alkyl, $C_{6-20}$ aromatic, and $C_{6-20}$ cycloaliphatic.

In specific embodiments, the dihydroxy compound of Formula (1) is 2,2-bis(4-hydroxyphenyl)propane (i.e. bisphenol-A or BPA). Other illustrative compounds of Formula (1) include: 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 1,1-bis(4-hydroxyphenyl)cyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; and 1,3-bis(2-(4-hydroxyphenyl)-2-propyl)benzene.

The polyorganosiloxane-polycarbonate can comprise 50 to 99 percent by weight of carbonate units and 1 to 50 percent by weight siloxane units. Within this range, the polyorganosiloxane-polycarbonate copolymer can comprise 70 to 98 percent by weight, more specifically 75 to 97 percent by weight of carbonate units and 2 to 30 percent by weight, more specifically 3 to 25 percent by weight siloxane units.

Polyorganosiloxane-polycarbonates can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards.

The polyorganosiloxane-polycarbonate can have a melt volume flow rate, measured at 300° C./1.2 kg, of 1 to 50 cubic centimeters per 10 minutes (cc/10 min), specifically 2 to 30 cc/10 min. Mixtures of polyorganosiloxane-polycarbonates of different flow properties can be used to achieve the overall desired flow property.

In one embodiment, Polycarbonate B is Polycarbonate-Polydimethylsiloxane copolymer containing approximately 18 to 20 percent siloxane. The polycarbonate-polysiloxane copolymer has a weight average molecular weight of 28,000 to 32,000.

Specifically, the polycarbonate-siloxane block copolymer can have the following formula:

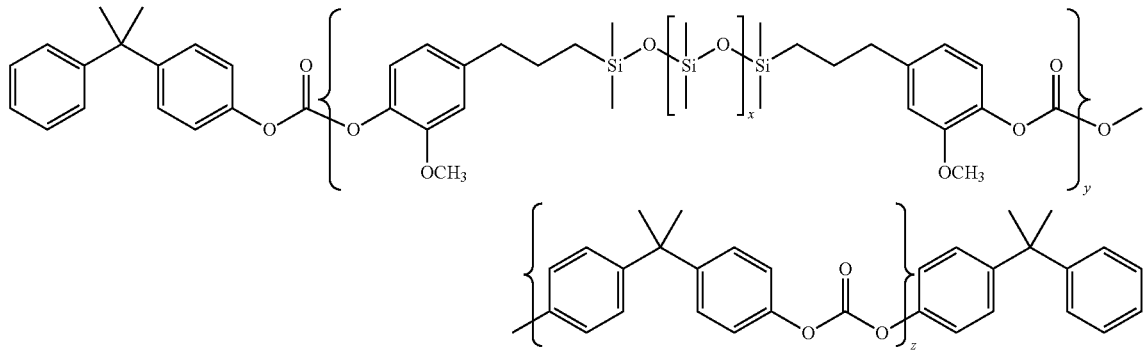

wherein x is 30-50, specifically about 40, y is 10-30, specifically about 20, and z is 45-60, specifically about 50 or 55.

In one embodiment, the thermoplastic composition comprises about 10 to 90 percent of the polycarbonate. In another embodiment, the thermoplastic composition comprises about 20 to 80 percent of the polycarbonate. In another embodiment, the thermoplastic composition comprises about 30 to 70 percent of the polycarbonate. In another embodiment, the thermoplastic composition comprises about 40-60 percent of the polycarbonate. Specifically, the polycarbonate is a bisphenol polycarbonate or mixture of polycarbonates.

Thus, in a specific embodiment, the thermoplastic composition comprises:

from 20 to 80 percent by weight of a PBT prepared as described herein, wherein the modified polyalkylene terephthalate contains 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and from 20 to 80 percent by weight of a bisphenol polycarbonate or mixture of polycarbonates;

wherein all weight percents are based on the total weight of the composition; and wherein no quencher for the catalyst complex is added to the compounded thermoplastic composition.

In another specific embodiment, the thermoplastic composition comprises:

from 20 to 80 percent by weight of a PBT prepared as described herein, wherein the modified polyalkylene terephthalate contains 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and from 20 to 80 percent by weight of a bisphenol polycarbonate or mixture of polycarbonates;

from 0 to 30 percent by weight of an impact modifier or other polymer; and from 0 to 5 percent by weight of an additive selected from fillers the group consisting of reinforcing agents, anti-oxidants, heat stabilizers, light stabilizers, ultraviolet light (UV) absorbers, plasticizers, lubricants, mold release agents, antistatic agents, colorants, blowing agents, melt strength additives, flame retardants, and anti-drip agents, and combinations thereof; and wherein all weight percents are based on the total weight of the composition; and wherein no quencher for the catalyst complex is added to the compounded thermoplastic composition.

In another specific embodiment, the thermoplastic composition comprises:

from 20 to 50 percent by weight of a PBT prepared as described herein, wherein the modified polyalkylene terephthalate contains 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and from 20 to 80 percent by weight of a bisphenol polycarbonate or mixture of polycarbonates;

from 0 to 30 percent by weight of an impact modifier or other polymer; and from 0 to 5 percent by weight of an additive selected from fillers the group consisting of reinforcing agents, anti-oxidants, heat stabilizers, light stabilizers, ultraviolet light (UV) absorbers, plasticizers, lubricants, mold release agents, antistatic agents, colorants, blowing agents, melt strength additives, flame retardants, and anti-drip agents, and combinations thereof; and wherein all weight percents are based on the total weight of the composition; and wherein no quencher for the catalyst complex is added to the compounded thermoplastic composition.

As indicated by the previous embodiment, other additives can be added to the modified polyalkylene terephthalate-polycarbonate thermoplastic blends for the purpose of imparting properties desirable in the product being made. Additives are ordinarily incorporated into polymer compositions with the proviso that the additives are selected so as to not significantly adversely affect the desired properties of the composition, for example, impact, flexural strength, color, and the like. Such additives can be mixed at a suitable time during the mixing of the components for forming the composition. Possible additives include impact modifiers, fillers, reinforcing agents, anti-oxidants, heat stabilizers, light stabilizers, ultraviolet light (UV) absorbers, plasticizers, lubricants, mold release agents, antistatic agents, colorants, blowing agents, melt strength additives, flame retardants, and anti-drip agents. A good source for information relating to additives is the *Plastics Additives Handbook, 6th* ed. (Hans Zweifel, Ed., 2009).

Combinations of additives can be used, for example, an antioxidant, a UV absorber, and a mold release agent. The total amount of additives (other than any impact modifier, filler, or reinforcing agents) is generally 0.01 to 15 percent by weight, based on the total weight of the composition.

Thus, in another embodiment, in addition to a modified polyalkylene terephthalate prepared as described herein and a polycarbonate, the thermoplastic composition further comprises an impact modifier. Many impact modifiers are known and are commercially available. Such impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of such impact modifiers can be used.

An example of specific type of impact modifier is an elastomer-modified graft copolymer comprising (i) an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt. % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Other impact modifiers include an epoxy-functional copolymer comprising units derived from a C2-20 olefin and units derived from a glycidyl(meth)acrylate. Exemplary olefins include ethylene, propylene, butylene, and the like. The olefin units can be present in the copolymer in the form of blocks, e.g., as polyethylene, polypropylene, polybutylene, and the like blocks. It is also possible to use mixtures of olefins, i.e., blocks containing a mixture of ethylene and propylene units, or blocks of polyethylene together with blocks of polypropylene.

In addition to glycidyl(meth)acrylate units, the copolymers can further comprise additional units, for example C1-4 alkyl(meth)acrylate units. In one embodiment, the impact modifier is terpolymeric, comprising polyethylene blocks, methyl acrylate blocks, and glycidyl methacrylate blocks. Specific impact modifiers are a co- or ter-polymer including units of ethylene, glycidyl methacrylate (GMA), and methyl acrylate, available under the trade name LOTADER® polymer, sold by Arkema. The terpolymers comprise, based on the total weight of the copolymer, 0.3 to 12 wt. % of glycidyl methacrylate units, more specifically 0.4 to 11 wt. % of glycidyl methacrylate units, even more specifically 0.5 to 10 wt. % of glycidyl methacrylate units. Suitable impact modifiers include the ethylene-methyl acrylate-glycidyl methacrylate terpolymer comprising 8 wt. % glycidyl methacrylate units available under the trade name LOTADER AX8900.

Specifically, such impact modifiers include methyl meth (acrylate)-butadiene-styrene, acrylonitrile-butadiene-styrene, styrene-ethylene/butylene-styrene, ethylene-glycidyl methacrylate-methyl acrylate, ethylene-glycidyl(meth)acrylate-methyl acrylate impact modifier, and combinations thereof.

In one embodiment, the thermoplastic composition comprises 0.01 to 20 percent by weight of an impact modifier. More particularly, about 1 to 20 percent by weight of the impact modifier is present in the thermoplastic composition of the invention. More particularly, about 5 to 15 percent by weight of the impact modifier is present in the thermoplastic composition of the invention. In a particular embodiment, the impact modifier is a methylmethacrylate butadiene styrene (MBS) used alone or with linear low density polyethylene (LLDPE).

In addition to the modified PBT prepared by the process disclosed herein, the polycarbonate, and the impact modifier, the thermoplastic composition contains a stabilizer. The stabilizer can be a mixture of stabilizers, such as antioxidants, heat stabilizers, light stabilizers, or ultraviolet light (UV) absorbers. Many impact modifiers are known and are commercially available. The total amount of stabilizer used is typically from 0.01 to 5 percent by weight, and more particularly from 0.01 to 3 percent by weight. In a particular embodiment, pentaerythritol betalaurylthiopropionate and one or more additional stabilizers is present in the thermoplastic composition. In a further embodiment, the additional stabilizer is pentaerythritol-tetrakis(3-(3,5-di-tert.butyl-4-hydroxy-phenyl-) propionate). In a particular embodiment, 0.01 to 1 percent by weight of pentaerythritol betalaurylthiopropionate is present in the composition and 0.01 to 1 percent by weight of the pentaerythritol-tetrakis(3-(3,5-di-tert.butyl-4-hydroxy-phenyl-)propionate). In a more particular embodiment, 0.01 to 0.1 percent by weight of pentaerythritol betalaurylthiopropionate is present in the composition and 0.01 to 0.1 percent by weight of the pentaerythritol-tetrakis(3-(3,5-di-tert.butyl-4-hydroxy-phenyl-)propionate).

In addition to the above-described additives, used accessorily in a small amount, depending on the object, other polymers or resins, typically in an amount less than 50 weight percent, specifically less than 30 percent by weight, more specifically less that 20 percent by weight, of the total composition, can be added to the thermoplastic resin composition containing the polyethylene terephthalate. For example, such additional polymers can include polyamides, polyphenylene sulfide, polyphenylene oxide, polyacetal, acrylonitrile-styrene resin, acrylonitrile-butadiene-styrene resin, polysulfone, polyesteramides, polyether sulfone, polyether imide, polyether ketone, fluorine resin, and combinations thereof.

In addition to modified polyalkylene terephthalate and polycarbonate, other polyesters can optionally be present in the composition (in an amount of less than 50 weight percent, specifically less than 30 percent by weight, more specifically less that 20 percent by weight, most specifically less than 10 percent by weight of the total composition, provided that such polyesters do not significantly and adversely affect the desired properties of the composition.

For example, a thermoplastic composition can include, in addition to the polyethylene terephthalate prepared by the present process other aromatic polyesters, cycloaliphatic polyesters, and the like. The additional polyesters can be virgin polyesters or wholly or partially bio-derived, including petroleum-derived aromatic polyesters and bio-derived aromatic polyesters.

The thermoplastic composition prepared as described herein is characterized by the intentional exclusion of a catalyst quencher such as an acid interchange quencher from the composition. Thus, a process according to the present invention can be further characterized by excluding (not adding) a catalyst quencher as a means for quenching the catalyst in the thermoplastic composition containing the modified polyalkylene terephthalate resin composition.

As indicated previously, quenchers are agents that inhibit activity of any catalysts that can be present in the thermoplastic composition, in order to prevent an accelerated interpolymerization and degradation of the polymer in the thermoplastic composition. Such quenchers are selected from the group consisting of acidic phosphate salts, acid phosphites, alkyl phosphites, aryl phosphites, mixed phosphites and combinations thereof, specifically acidic phosphate salts; acid phosphites, alkyl phosphites, aryl phosphites or mixed phosphites having at least one acidic hydrogen; a Group IB or Group IIB metal phosphate salt; a phosphorus oxo acid, a metal acid pyrophosphate or a mixture thereof. The acidic phosphate salts can include sodium dihydrogen phosphate, mono zinc phosphate, potassium hydrogen phosphate, calcium dihydrogen phosphate and the like. Specific quenchers are phosphoric acid, phosphorous acid or their partial esters such as mono zinc phosphate. More specifically, quenchers can include zinc phosphate, monozinc phosphate, phosphorous acid, phosphoric acid diluted in water, sodium acid pyrophosphate, tetrapropylorthosilicate, tetrakis-(2-methoxyethoxy)silane), sodium lauryl sulphate, boric acid, citric acid, oxalic acid, a cyclic iminoether containing compound, and combinations thereof.

In one embodiment, the thermoplastic composition, comprises from 30 to 70 percent by weight of a modified polyalkylene terephthalate, wherein the modified polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof;

from 30 to 70 percent by weight of a polycarbonate; and
from 0.01 to 20 percent by weight of an impact modifier; and wherein all weight percents are based on the total weight of the composition; and wherein no quencher for the catalyst complex is added to the compounded thermoplastic composition.

In one embodiment, the thermoplastic composition, comprises from 20 to 50 percent by weight of a modified polyalkylene terephthalate, wherein the modified polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof;

from 30 to 70 percent by weight of a polycarbonate; and
from 0.01 to 20 percent by weight of an impact modifier; and wherein all weight percents are based on the total weight of the composition; and wherein no quencher for the catalyst complex is added to the compounded thermoplastic composition.

In another embodiment, the thermoplastic composition, comprises:

from 25 to 35 percent by weight of a modified polyalkylene terephthalate, wherein the modified polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof;

40 to 60 percent by weight of a polycarbonate;
1 to 20 percent by weight of an impact modifier; and
0.01 to 5 percent by weight of a stabilizer;

wherein all weight percents are based on the total weight of the composition; and wherein no quencher for the catalyst complex is added to the compounded thermoplastic composition.

In another embodiment, the thermoplastic composition, comprises:

from 20 to 50 percent by weight of a polybutylene terephthalate, wherein the polybutyene terephthalate contains 50 to 300 ppm of tetraisopropyl titanate and 100 to 600 ppm of phosphoric acid;

from 40 to 60 percent by weight of a bisphenol A polycarbonate;

from 1 to 20 percent by weight of an impact modifier comprising MBS alone or with LLDPE; and from 0.01 to 3 percent by weight of a stabilizer;

wherein all weight percents are based on the total weight of the composition; and wherein no quencher for the catalyst complex is added to the compounded thermoplastic composition.

In another embodiment, the invention is directed to a hydrostable thermoplastic composition, comprising:

from 25 to 35 percent by weight of a modified polyalkylene terephthalate, wherein the modified polyalkylene terephthalate contains 50 to 300 ppm of tetra($C_1$-$C_8$ alkyl)

titanate and 100 to 600 ppm of a phosphorous containing compound selected from the group consisting of phosphoric acid, poly(phosphoric acid), phosphorus acid, monobutyl phosphate, dibutyl phosphate, monoalkyl phosphates, dialkyl phosphates, and combinations thereof; and from 40 to 60 percent by weight of a polycarbonate from 5 to 15 percent by weight of an impact modifier or other polymer; and from 0.01 to 0.1 percent by weight of pentaerythritol betalaurylthiopropionate;

and 0.01 to 0.1 percent by weight of pentaerythritol-tetrakis(3-(3,5-di-tert.butyl-4-hydroxy-phenyl-)propionate); and wherein all weight percents are based on the total weight of the composition; and wherein no quencher for the catalyst complex is added to the compounded thermoplastic composition.

In another embodiment, the invention is directed to a hydrostable thermoplastic composition, comprising:

from 25 to 35 percent by weight of a modified polyalkylene terephthalate, wherein the modified polyalkylene terephthalate contains 50 to 300 ppm of tetra($C_1$-$C_8$ alkyl) titanate and 100 to 600 ppm of a phosphorous containing compound selected from the group consisting of phosphoric acid, poly(phosphoric acid), phosphorus acid, monobutyl phosphate, dibutyl phosphate, monoalkyl phosphates, dialkyl phosphates, and combinations thereof; and from 40 to 60 percent by weight of a polycarbonate from 5 to 15 percent by weight of an impact modifier or other polymer; and from 0.01 to 3 percent by weight of an additive selected from a nucleating agent, antioxidant, UV stabilizer, plasticizer, epoxy compound, melt strength additive, or a combination thereof, crosslinkers, and combinations thereof; and wherein all weight percents are based on the total weight of the composition; and wherein no quencher for the catalyst complex is added to the compounded thermoplastic composition.

A thermoplastic composition comprising the modified polyalkylene terephthalate as described herein can be prepared by blending the components of the thermoplastic composition employing a number of procedures. In an exemplary process, the thermoplastic composition comprising a modified polyalkylene terephthalate prepared according to the present process, an optional reinforcing filler, and any optional other polymers or additives are placed into an extrusion compounder to produce molding pellets. The components are dispersed in a matrix in the process. In another procedure, the components and reinforcing filler are mixed by dry blending, and then fluxed on a mill and comminuted, or extruded and chopped. The thermoplastic composition can also be mixed and directly molded, e.g., by injection or transfer molding techniques. Specifically, all of the components are freed from as much water as possible. In addition, compounding is carried out to ensure that the residence time in the machine is short; the temperature is carefully controlled; the friction heat is utilized; and an intimate blend between the components is obtained.

The components of the thermoplastic composition can be pre-compounded, pelletized, and then molded. Pre-compounding can be carried out in conventional equipment. For example, after pre-drying the polyester composition (e.g., for four hours at 120° C.), a single screw extruder can be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) can be fed downstream. In either case, a generally suitable melt temperature will be 230° C. to 300° C. The pre-compounded composition can be extruded and cut up into molding compounds such as conventional granules, pellets, and the like by standard techniques. The composition can then be molded in any equipment conventionally used for thermoplastic compositions capable of insert molding.

Thus, in another aspect, the invention is directed to a process for forming a thermoplastic composition by blending, based on the total weight of the thermoplastic composition, the following:

from 25 to 35 percent by weight of a modified polyalkylene terephthalate, wherein the modified polyalkylene terephthalate contains 50 to 300 ppm of tetra($C_1$-$C_8$ alkyl) titanate and 100 to 600 ppm of a phosphorous containing compound selected from the group consisting of phosphoric acid, poly(phosphoric acid), phosphorus acid, monobutyl phosphate, dibutyl phosphate, monoalkyl phosphates, dialkyl phosphates, and combinations thereof; and 40 to 60 percent by weight of a polycarbonate from 0.01 to 20 percent by weight of an impact modifier or other polymer; and from 0.01 to 5 percent by weight of an additive selected from a nucleating agent, antioxidant, UV stabilizer, plasticizer, epoxy compound, melt strength additive, or a combination thereof, crosslinkers, and combinations thereof; wherein no quencher for the catalyst complex is added to the compounded thermoplastic composition; and extruding, calendaring, extrusion molding, blow molding, solvent casting, or injection molding the thermoplastic composition;

wherein all weight percents are based on the total weight of the composition; and wherein no quencher for the catalyst complex is added to the compounded thermoplastic composition.

Advantageously, useful articles can be made from the polyalkylene terephthalate made according to the process described herein or thermoplastic compositions comprising the modified polyalkylene terephthalate. In a specific embodiment, an article is extruded, calendared, or molded, for example blow molded or injection molded from the modified polyalkylene terephthalate or composition containing the polymer. The article can be a film or a sheet. When the article is a film, the article can be formed by extrusion molding or calendaring the modified polyalkylene terephthalate or thermoplastic composition containing the polyester.

The thermoplastic compositions made from the present process provide product lines that have superior hydrolytic stability. In particular, such thermoplastic compositions can provide improved hydro and heat resistance in abusive molding and outdoor application.

As stated above, various combinations of the foregoing embodiments can be used.

The invention is further described in the following illustrative examples in which all parts and percentages are by weight unless otherwise indicated.

EXAMPLES

The following examples illustrate the scope of the invention. The examples and preparations which follow are provided to enable those skilled in the art to more clearly understand and to practice the present invention. They should not be considered as limiting the scope of the invention, but merely as being illustrative and representative thereof. The examples are annotated as "E." and comparative examples are annotated hereinafter as "CE", employed the materials listed in Table 1. The invention is further described in the following illustrative examples in which all parts and percentages are by weight unless otherwise indicated.

TABLE 1

| Component | Trade Name and Supplier |
|---|---|
| BDO | 1,4-Butanediol, CAS Reg. No. 110-6304, from BASF. |
| PA | Phosphoric Acid (85 percent in water) CAS Reg. No. 7664-38-2, from Acros. |
| TPT | Tetraisopropyl titanate, CAS Reg. No. 546-68-9, from DuPont, commercial Tyzor grade |
| DMT | Dimethyl Terephthlate, CAS Reg. No. 120-61-6., from Invista |
| Polyester I | Polybutylene Terephthalate (PBT) sold by SABIC Innovative Plastics as VALOX ® 315 with an intrinsic viscosity of 1.2 $cm^3/g$ as measured in a 60:40 phenol/tetrachloroethane. |
| PE-II | Modified PBT prepared by the process disclosed in Part B, below |
| Polycarbonate 1 | Bisphenol A polycarbonate resin, CAS Reg. No. 25971-63-5 having a Mw of about 30,000 g/mol, available from SABIC Innovative Plastics Plastics as PC 105 |
| Polycarbonate II | Bisphenol A polycarbonate resin available from SABIC Innovative Plastics as LEXAN ML8199-111N |
| Phosphorous Acid | Phosphorous Acid (45 percent in water), available from Brenntag Mid-South, Inc. |
| Antioxidant | Pentaerythritol betalaurylthiopropionate, CAS Reg. No. 29598-76-3, available from Chemtura Corporation. |
| MBS | Methylamethacrylate-butadfiene styrene impact modifier available as Paraloid EXL-3650A from the Dow Chemical Company |
| LLDPE | Linear low density polyethylene, from Nova Chemicals, Corp. |
| Hindered Phenol Stabilizer | Pentaerythritol-tetrakis(3-(3,5-di-tert.butyl-4-hydroxy-phenyl-)propionate), CAS Reg. No. 6683-19-8, available from BASF Corp. |
| Recycled PET | Obtained from Futura Polyesters Ltd. |

As indicated in Table 1, recycled PET was obtained from Futura Polyesters, Ltd. The recycled polyester was prepared for processing as follows. The post-consumer PET scrap or bottle scrap were collected and hydraulically compressed in the form of bales. The bales were then transported to the cleaning sites. De-baling was achieved using hot water, enabling the bottles to loosen up from the tightly compressed bales to free bottles. Additionally, subjecting the bottles to hot water loosened the sticker from the bottles. Any polyvinyl chloride bottles turned milky white post the hot water wash and were removed. The sorted (clear) bottles were ground to flakes of 3 mm to 5 mm size. The flakes were then subject to hydro-flotation. In hydro-flotation, polypropylene and paper were removed from PET flakes by density separation. The clean PET flakes were alkali washed to remove any glue. The PET flakes were subjected to two cycles of process-water wash and one cycle of washing using demineralized water. The clean flakes were then dried and bagged.

Extrusion, Molding, and Testing

For the compositions disclosed herein, ingredients were tumble blended and then extruded on 27 mm twin-screw extruder with a vacuum vented mixing screw, at a barrel and die head temperature between 240 to 265° C. and a 300 rpm screw speed. The extrudate was cooled through a water bath prior to pelletizing. ASTM tensile, Izod and flexural bars were injection molded on a van Dorn molding machine with a set temperature of approximately 240-265° C. The pellets were dried for 3-4 hours at 120° C. in a forced air-circulating oven prior to injection molding.

Notched and un-notched Izod testing was done on 75 mm×12.5 mm×3.2 mm bars using ASTM method D256 at both 23° C. and −30° C. using 5 lbf/ft pendulum energy.

Tensile properties were measured according to ASTM D 638 at 23° C. and 50 mm/min speed for 5 mm/min for K4560 examples.

Flexural properties were tested per ASTM D790 with 3.2 mm thickness specimen and 1.27 mm/min speed.

Specific gravity was measured per ASTM D792.

Vicat softening temperature was tested per ASTM D1525 with 10 N load and 50° C./Hour temperate rate. Vicat temperature was tested on both regular molded examples as well as abusively molded examples. Abusive molding here refers to molding conditions that have 15° C. higher barrel temperature and double dwelling time than regular molding.

Heat deflection temperature (HDT) was tested per ASTM D648 with 1.82 MPa stress on 3.2 mm thickness specimens.

Melt volume-flow rate (MVR) was tested per ASTM D1238 at 250° C. with 5 kg load and 240 s dwell time.

Melt viscosity was determined as a function of time at 265° C. for 30 minutes. This test is also known as "time-sweep". Percent viscosity change was reported.

Hydrostability Tensile and Izod bars were aged in a pressure cooker at 110° C. and 100% relative humidity. Izod and tensile performance of the specimens were measured after 1 day, 2 days, and 5 days 9 days in the pressure cooker.

$^1$H NMR spectroscopy allowed confirmation of the structures of the polymers synthesized. Polymer samples were first dissolved in a 70/30 mixture of deuterated TFA/chloroform and then subjected to $^1$H for compositional analysis.

Differential scanning calorimetry (DSC) analysis was conducted on all examples with a ramp rate of 20° C./min and temperature range of 40 to 300° C.

Color (L*, a*, and b*) values were obtained through the diffuse reflectance method using a Gretag Macbeth Color-Eye 7000A with D65 illumination.

The intrinsic viscosity (IV) of the polymer was measured using an automatic Viscotek Microlab® 500 series Relative Viscometer Y501. In a typical procedure, 0.5000 g of polymer sample was fully dissolved in a 60/40 mixture (by vol) of % phenol/1,1,2,2-tetrachloroethane solution (Harrell Industries). Two measurements were taken for each sample, and the result reported was the average of the two measurements.

Carboxylic acid end group concentration was measured through manual titration. The sample resin was dissolved in phenol and dichlorobenzene solvents. Potassium hydroxide in methanol was used as titrant and bromo phenol blue was used as indicator. The analysis was conducted under room temperature and end point color is blue.

Titanium and phosphorous concentrations were obtained from elemental analysis using inductive coupling plasma (ICP) microwave method to confirm the molar ratio of catalyst reactants, TPT and HP.

Part A. Lab Scale Preparation of Modified PBT from Recycled PET

Comparative Example 1 (CE-1)

PBT was prepared on a lab scale from recycled PET and 1,4-butandiol (BDO) using a 1-L 3-necked round bottom flask equipped with a condenser and a vacuum output. A 86.4 g amount of recycled PET and 140 g of BDO were introduced into a three-neck round bottom flask. The reactor was placed in an oil bath temperature of 170° C. Then, 250 ppm of TPT was added to the reaction mixture, and the ester interchange temperature was increased to 220° C. at a rate of 2° C./min while stirring at 260 rpm under nitrogen. After waiting 40 minutes for depolymerization and the ester interchange to occur, the temperature of the reaction mixture was increased further to 250° C. Polymerization was initiated with the vacuum adjusted to below 1 Torr for 1 hour. The polymerization was stopped after achieving the desired intrinsic viscosity.

Example 2 (E-2)

Modified PBT was prepared on a lab scale from recycled PET and 1,4-butandiol (BDO) in the presence of a phosphorous-containing catalyst prepared in situ through the complexation between TPT and phosphoric acid in a 1:0.3 molar ratio. First, 50 g of BDO and 0.15 ml of phosphoric acid solution in water (0.1 g/ml) were introduced into a three neck round bottom flask. The reactor was placed in an oil bath at a temperature of 175° C. After 20 minutes, 250 ppm of TPT was added to the reactor and an in situ complexation between phosphoric acid and TPT was carried out for 40 minutes under $N_2$ atmosphere. Then, 87.4 g of PET and 80 g of additional BDO were introduced into the catalyst solution, and the ester interchange temperature was increased to 220° C. at a rate of 2° C./min while stirring at 260 rpm under nitrogen. After the depolymerization ceased, the temperature of the reaction mixture was further increased to 250° C. to melt the residual PET flakes completely. Polymerization was initiated with vacuum adjusted to below 1 Torr for 40 minutes. The polymerization was stopped after achieving the desired intrinsic viscosity.

Example 3 (E-3)

Modified PBT was prepared on a lab scale from recycled PET and 1,4-butandiol (BDO) using a catalyst was prepared in situ by the reaction between TPT and phosphoric acid in a 1:0.6 molar ratio. First, 50 g of BDO and the phosphoric acid solution (0.1 g/ml in water), to provide the necessary ratio, were introduced into a three neck round bottom flask. The reactor was placed in an oil bath at a temperature of 175° C. After 20 minutes, 250 ppm of TPT was added to the reactor, and an in situ complexation between phosphoric acid and TPT was carried out for 40 minutes under a $N_2$ atmosphere. Then, 87.4 g of PET and 80 g of additional BDO were introduced into the catalyst solution, and the ester interchange temperature was increased to 220° C. at a rate of 2° C./min while stirring at 260 rpm under nitrogen. After the depolymerization is completed and ceases, the temperature of the reaction mixture was further increased to 250° C. to melt the residual PET flakes completely. Polymerization was initiated with the vacuum adjusted to below 1 Torr and carried out for 40 minutes. The polymerization was stopped after achieving the desired intrinsic viscosity.

Example 4 (E-4)

Modified PBT was prepared one lab scale from recycled PET, and 1,4-butandiol (BDO) using catalyst that was prepared in situ by the reaction between TPT and phosphoric acid in 1:1 molar ratio. First, 50 g of BDO, phosphoric acid solution (0.1 g/ml in water), to obtain the indicated molar ratio, were introduced into a three-neck round bottom flask, which was placed in an oil bath at a temperature of 175° C. After 20 minutes, 250 ppm of TPT was added to the reactor and in situ complexation between phosphoric acid and TPT was carried out for 40 minutes under a nitrogen atmosphere. Then, 87.4 g of PET, and 80 g of additional BDO were introduced into the catalyst solution, and the ester interchange temperature was increased to 220° C. at a rate of 2° C./min while stirring at 260 rpm under nitrogen. After the completed depolymerization ceases, the temperature of the reaction mixture was further increased to 250° C. to melt the residual PET flakes completely. Polymerization was initiated with the vacuum adjusted to below 1 Torr and carried out for 40 minutes. The polymerization was stopped after achieving the desired intrinsic viscosity.

Example 5 (E-5)

Modified PBT was prepared on a lab scale from recycled PET and 1,4-butandiol (BDO) using catalyst prepared in situ by the reaction between TPT and phosphoric acid in a 1:1.2 molar ratio. First, 50 g of BDO and phosphoric acid solution (0.1 g/ml in water), to obtain the indicated molar ration, were introduced into a three-neck round bottom flask. The reactor was placed in an oil bath at a temperature of 175° C. After 20 minutes, 250 ppm of TPT was added to the reactor and an in situ complexation between phosphoric acid and TPT was carried out for 40 minutes under nitrogen atmosphere. Then, 87.4 g of PET and 80 g of additional BDO were introduced into the catalyst solution and the ester interchange temperature was increased to 220° C. at a rate of 2° C./min while stirring at 260 rpm under nitrogen. After the completed depolymerization ceased, the temperature of the reaction mixture was further increased to 250° C. to melt the residual PET flakes completely. Polymerization was initiated with the vacuum adjusted to below 1 Torr for 40 minutes. The polymerization was stopped after achieving desired intrinsic viscosity.

Example 6 (E-6)

Modified PBT was prepared on a lab scale from recycled PET and 1,4-butandiol (BDO) in which the catalyst was prepared in situ by the reaction between TPT and phosphoric acid in a 1:1.5 molar ratio. First, 50 g of BDO and phosphoric acid solution (0.1 g/ml in water) were introduced into a three-neck round bottom flask. The reactor was placed in an oil bath at a temperature of 175° C. After 20 minutes, 250 ppm of TPT was added to the reactor and in situ complexation between phosphoric acid and TPT was carried out for 40 minutes under a nitrogen atmosphere. Then, 87.4 g of PET and 80 g of additional BDO were introduced into the catalyst solution, and the ester interchange temperature was increased to 220° C. with a rate of 2° C./min while stirring at 260 rpm under nitrogen. After the completed depolymerization ceased, the temperature of the reaction mixture was further increased to 250° C. to melt the residual PET flakes completely. Polymerization was initiated with the vacuum adjusted to below 1 Torr for 40 minutes. The polymerization was stopped after achieving desired intrinsic viscosity.

Example 7 (E-7)

Modified PBT was prepared on a lab scale from recycled PET and 1,4-butandiol (BDO) in which the catalyst was prepared in situ by the reaction between TPT and phosphoric acid in a 1:2 molar ratio. First, 50 g of BDO and phosphoric acid solution in water (0.1 g/ml), to obtain the indicated molar ratio, were introduced into a three neck round bottom flask that was placed in an oil bath at a temperature of 175° C. After 20 minutes, 250 ppm of TPT was added to the reactor, and an in situ complexation between phosphoric acid and TPT was carried for 40 minutes under a nitrogen atmosphere. Then, 87.4 g of PET and 80 g of additional BDO were introduced into the catalyst solution. The ester interchange temperature was increased to 220° C. at a rate of 2° C./min while stirring at 260 rpm under the nitrogen. After the completed depolymerization ceased, the temperature of the reaction mixture was further increased to 250° C. to melt the residual PET flakes completely. Polymerization was initiated with the vacuum adjusted to below 1 Torr and carried out for 40 minutes. The polymerization was stopped after achieving the desired intrinsic viscosity.

Example 8 (E-8)

Modified PBT was prepared on a lab scale from recycled PET and 1,4-butandiol (BDO) using catalyst prepared in situ by the reaction between TPT and phosphoric acid in a 1:3 molar ratio. First, 50 g of BDO and the requisite amount of phosphoric acid solution in water (0.1 g/ml) to obtain the indicated molar ratio were introduced into a three-neck round bottom flask. The reactor was placed in an oil bath at a temperature of 175° C. After 20 minutes, 250 ppm of TPT was added to the reactor. An in situ complexation between phosphoric acid and TPT was carried out for 40 minutes under nitrogen atmosphere. Then, 87.4 g of PET and 80 g of additional BDO were introduced into the catalyst solution. The ester interchange temperature was increased to 220° C. at a rate of 2° C./min while stirring at 260 rpm under nitrogen. After the completed depolymerization ceased, the temperature of the reaction mixture was further increased to 250° C. to melt the residual PET flakes completely. Polymerization was initiated and carried out with the vacuum adjusted to below 1 Torr for 40 minutes. The polymerization was stopped after achieving the desired intrinsic viscosity.

The modified PBT resins prepared in Examples 1-8 were tested and results shown in Table 2 below.

TABLE 2

| Ex. | Phosphoric Acid/TPT | TPT (ppm) | IV (dL/min) | $T_m$ (° C.) | PDI | Mn | Mw |
|---|---|---|---|---|---|---|---|
| CE-1 | 0 | 250 | 0.976 | 216 | 2.8 | 32000 | 89000 |
| E-2 | 0.3 | 250 | 0.905 | 220 | 2.8 | 31000 | 86000 |
| E-3 | 0.6 | 250 | 0.725 | 219 | 2.6 | 24000 | 63000 |
| E-4 | 1 | 250 | 0.791 | 216 | 2.8 | 25000 | 69000 |
| E-5 | 1.2 | 250 | 0.848 | 218 | 3.1 | 27000 | 63000 |
| E-6 | 1.5 | 250 | 0.661 | 209 | 2.6 | 22000 | 57000 |
| E-7 | 2 | 250 | 0.618 | 181 | 2.5 | 22000 | 55000 |
| E-8 | 3 | 250 | 0.202 | 119 | 2.2 | 4900 | 11000 |

Table 2 summarizes the intrinsic viscosity, melting temperature, and molecular weight of the resin samples made as described in Examples 1-8, prepared by a polycondensation reaction between PET and BDO. Example C-1 represents the control. Examples 2 to 8 were synthesized with an situ catalyst according to the present process. The phosphoric acid to TPT molar ratios given in Table 1 are the calculated molar ratio based on the amounts used for the catalyst preparation.

A strong correlation was found between the IV and number average molecular weight results for the resins. The present process enables high molecular weight polyester and IV up to 1.2 molar ratio between phosphoric acid and TPT (Examples 2-5). Above this ratio, the IV and molecular weight of the PBT resin started decreasing gradually. At the molar ratio of 3, the polymerization resulted in oligomers.

As analyzed, the backbone compositions of the PBT prepared in the comparative Example C-1 and Examples 2-8 prepared in the presence of TPT and phosphoric acid are shown in Table 3.

TABLE 3

| Ex. | Phosphoric Acid/TPT | Catalyst Amount (ppm) | Iso-phthalic (mol %) | Tere-phthalic (mol %) | EG (mol %) | BDO (mol %) |
|---|---|---|---|---|---|---|
| CE-1 | 0 | 250 | 1.0 | 49.7 | 1.4 | 48.0 |
| E-2 | 0.3 | 250 | 1.0 | 49.6 | 1.1 | 48.3 |
| E-3 | 0.6 | 250 | 1.0 | 49.5 | 1.5 | 48.0 |
| E-4 | 1 | 250 | 1.0 | 49.6 | 1.9 | 47.5 |
| E-5 | 1.2 | 250 | 1.0 | 49.8 | 1.4 | 47.8 |
| E-6 | 1.5 | 250 | 1.0 | 49.9 | 4.9 | 44.1 |
| E-7 | 2 | 250 | 1.0 | 50.3 | 17.6 | 31.1 |
| E-8 | 3 | 250 | 0.9 | 50.2 | 22.1 | 26.9 |

Table 3 above summarizes the backbone chemical composition of the resin, based on $^1$H NMR analysis. Since recycled PET was used as a monomer feedstock, the introduction of comonomer impurities such as isophthalic and ethylene glycol (EG) moieties was inevitable. (The ethylene glycol (EG) content within the PBT backbone can be varied depending on the vacuum condition, i.e., process parameters.) A 1 mol % of isophthalic moieties within in the backbone was found to not change the crystallinity and melting temperature of the resin drastically.

The EG content was found to stay under 2 mol % up to a molar ratio of 1.2. Above this molar ratio, the EG content continued to gradually increase. Using the catalyst that was prepared in a molar ratio greater than 1.2 was found to result in the catalyst losing its transesterification capability for butylene terephthalate and favoring more PET polymerization, which led to a large increase of the polymerization time. The large increase in EG content in the backbone above a molar ratio of 1.2 affects the crystallinity of the resulting resin by lowering the melting temperature.

The melting temperatures of Examples 2 to 5 were similar to the melting temperature of the control (Example C-1). After the molar ratio of 1.2, however, the melting temperature gradually dropped. The melting temperature gradually decreased above the molar ratio of 1.2 and, below this molar ratio stayed very close to the melting temperature of the control Example C-1.

Based on the examples, it can be concluded that the synthesis of modified PBT from the melt polycondensation reaction between PET and BDO can be accomplished in the presence of new in situ catalyst prepared by the reaction of TYZOR® TPT catalyst and phosphoric acid prior to the depolymerization and ester interchange. Furthermore, the ratio between phosphoric acid and TPT can be controlled to obtain a PBT providing the same standard performance as virgin PBT shows. In these particular examples, the molar ratio of 1.2, with respect to the novel catalyst, was the maximum ratio for the process to obtain a molecular weight, IV, melting temperature and EG content within a given limit, wherein the molecular weight, IV and melting temperature decreased along with a catalyst-component molar ratio greater than 1.2. The catalyst-component molar ratio was found to affect the introduction of EG moieties in the PBT backbone, wherein above the molar ratio of 1.2, the EG content increased above 2 mol %, resulting in a crystallinity and melting temperature drop, whereas a total impurity level (isophthalic acid and EG) below 3 mole % provides a modified PBT resin with a standard performance similar to virgin PBT resin.

B. Comparative Example 9 (CE-9). Scale-Up Process for Preparing Modified PBT The reference process for preparing PBT is described in U.S. Pat. No. 7,902,263. A modified polybutylene random copolymer was derived from a polyethylene terephthalate component in a helicone reactor. The helicone reactor had a capacity of 40 liters and was equipped with a special design of twin opposing helical blades with 270 degree twist; constructed of 316 SS with 16 g polish finish. The blade speed varied from 1 to 65 rpm. The agitators were connected to a 7.5 HP Constant Torque Inverter Duty Motor, which operates at 230/460 VAC, 3 PH and 60 Hz. These agitators provided excellent surface area for the polymer melt in order to build molecular weight. The helicone was also designed with an overhead condenser to condense the vapors in the glycolysis, transesterification (if any) and polymerization stages.

25 lbs (11.4 kg) of recycled PET pellets and 35 lbs (15.9 kg) of BDO (molar ratio 2.9:1) were charged to the helicone reactor. 4.6 ml of TPT catalyst (100 ppm as Ti) were also added to the reaction mix. The temperature of the heating oil (for the helicone) was set to 250 C. The agitator speed was set at 67% of maximum. The BDO was refluxed into the reactor for 2 hours. It should be noted that the design of the overhead condenser system did not allow a complete reflux of the BDO. As a result, about 5 to 10 lbs (2.3 to 4.5 kg) of BDO that evolved in the initial stages could not be refluxed. The BDO evolved after the initial stages could be completely refluxed into the reactor.

For the polymerization stage (also referred to in this draft as 'poly stage'), a vacuum was applied to the helicone reactor and the reflux of BDO to the reactor was discontinued. The speed of the agitator was set to 60% of max and the target amps of the motor were 3.5 amps. The system pressure was brought down to 0.5 Torr (0.066 kPa) by the vacuum blower. The reaction was carried out until the polymer mass reached its $3^{rd}$ build. The reaction was stopped after 15 minutes into the $3^{rd}$ build and the polymer was cast in blobs. The product was allowed to dry and then was ground into pellets.

C. Examples 10-12. Improved Process for Preparing Modified PBT Using 1,4 Butanediol and Recycled Polyethylene Terephthalate by Melt or Solid State Polyccondensation PBT was prepared in a pilot plant by reacting polyethylene terephthalate with 1,4-butanediol with catalyst ratios (TPT:PA) of 1:0, 1:0.25, 1:0.65, 1:0.8, 1:1, 1:1.2, and 1:1.5. All the resins were produced via a two-step process. The first step involved batch processing, including catalyst preparation, depolymerization, transesterification and polycondensation. An IV of 0.75 dL/g was targeted at the end of this process. The second step was the solid state polymerization processing, targeting an IV of 1.2 dL/g.

Melt Polymerization.

The melt polymerization process was carried in a pilot plant equipped with a single batch reactor. The process involved four steps: in-situ catalyst preparation, depolymerization of recycled PET (rPET), ester interchange (EI), and polymerization.

First, ethylene glycol (EG) and phosphoric acid (the amount used depended on the titanium catalyst concentration; See Table 2) were charged into the reactor and the reactor temperature was raised to 120° C. at atmospheric pressure (approximately 1050 mbar). The mixture was held at this temperature and atmospheric pressure for 30 minutes to remove moisture. The calculated amount of titanium isopropoxide (115 ppm of Ti based on the polymer wt.) was added into the reactor and the reactor temperature was raised to 170° C. The mixture was held at 170° C. for 70 minutes. Recycled PET (rPET) was then charged into the reactor (rPET:EG=1:1.5 mol). The reactor temperature was then increased to 225° C. and the pressure was set to 3.5 mbar.

Depolymerization of rPET to bis-hydroxy ethyl terephthalate (BHET) was completed in 90 minutes by holding the mixture at these conditions. After completion of depolymerization, the reactor was depressurized to 1050 mbar. BDO (rPET:BDO=1:3.6 mol ratio) was added to the reactor and the reactor temperature was maintained at 225° C. to complete atmospheric distillation until the column top temperature dropped. A vacuum of 700 mbar was applied gradually in the transesterification step to remove EG while maintaining the reactor temperature at 225° C. for 30 minutes and the overhead line temperature at 180° C. which allowed BDO reflux back into the reactor. EG and BDO were collected as overheads during the transesterification step. The batch was held at these conditions until the column top temperature dropped to 130° C. In the polymerization step, the reactor temperature was increased to 240° C. and a vacuum was applied by gradually reducing the pressure to approximately 1 mbar, to remove excess BDO, THF, and EG as overheads. After stabilizing the vacuum at approximately 1 mbar and the reactor temperature between 240 and 250° C., the torque in the reactor was monitored until achieving the required intrinsic viscosity (IV) (between 0.7 and 0.8 dL/g). Finally, the polymer melt was drained and then pelletized.

Solid State Polymerization.

In order to get a high value of IV (1.17-1.25 dL/g) for the resin prepared from rPET, low viscosity resins obtained from the batch process were subjected to solid state polymerization in a tumbling reactor at 100 mbar pressure at a temperature of 200° C. for about 18 to 30 h. The IV was checked intermittently during the viscosity build-up and a product with a final IV value of 1.25 was obtained.

Results

Table 4 summarizes the process parameters and results for Comparative Example 9 (CE-9), Example 10 (E-10), Example 11 (E-11), and Example 12 (E-12) resins. CE-9 resin was prepared through conventional titanium based catalyst using the process disclosed in U.S. Pat. No. 7,902,263 as described in Part B. E-10, E-11, and E-12 were prepared according to the new process as provided in Part C and had TPT:PA ratios of 1:0.25, 1:0.65, and 1:0.8, respectively. Color (L*, a*, and b*) values were obtained for each example.

After the batch process, each resin met the targeted IV, and all batches had the same color and the same carboxylic acid end group concentration (CEG). The polymerization cycle time was decreased for the batches using the new catalyst, indicating that the phosphoric acid content of the catalyst contributes to the polymerization process by promoting catalysis. However, increased concentration of phosphoric acid in the catalyst did not show a significant effect on the polymerization cycle time.

After solid state polymerization, all resins achieved an IV close to 1.2 dL/g with low carboxylic end group (CEG) values (approximately 10 meq/g). The processing temperature was 200° C. The IV build-up rate decreased as the phosphoric acid content in the in-situ catalyst increased.

Table 5 shows the process parameters and results for E-13, E-14, and E-15 resins, which were also prepared via the new process, and had TPT:PA ratios of 1:1, 1:1.2, and 1:1.5, respectively. All three resins reached IV values that were lower than the target. The polymerization cycle time increased along with the increase of the phosphoric acid content of the examples. The L* values of the resulting resins decreased compared to resins summarized in Table 3. A reason for the lower L* values may be the decrease of crystallinity due to the insertion of PET block within the backbone. Since the melting temperature of the resulting resins was lower, the solid state polymerization was unsuccessful. The IV build-up to the targeted IV was extremely slow for the final resins.

Both Tables 4 and 5 show that the ratio between TPT and phosphoric acid in the preparation of the catalyst directly affects depolymerization and polycondensation. For TPT:PA ratios above 1:0.8, the depolymerization step was not be completed and a large extent of PET insertion was observed, resulting in lower melting temperature and L* value, indicating less crystalline product.

TABLE 4

Process Parameters and Results of PBT Resins Prepared in Pilot Plant

| | | VALUE ACHIEVED | | | | | | |
|---|---|---|---|---|---|---|---|---|
| | UNITS | CE-9 | E-10 | | E-11 | | E-12 | |
| BATCH PARAMETER | | | | | | | | |
| Batch weight | Kg | 10 | 10 | 10 | 10 | 10 | 10 | 10 |
| Molar ratio (PET:BDO) | Ratio | 1:3.6 | 1:3.6 | 1:3.6 | 1:3.6 | 1:3.6 | 1:3.6 | 1:3.6 |
| White Flakes/PCR PET CHIPS | Kg | 8.727 | 8.727 | 8.727 | 8.727 | 8.727 | 8.727 | 8.727 |
| MEG FOR DEPOLY | Kg | 4.227 | 4.227 | 4.227 | 4.227 | 4.227 | 4.227 | 4.227 |
| BDO | Kg | 14.727 | 14.727 | 14.727 | 14.727 | 14.727 | 14.727 | 14.727 |
| TPT - CATALYST (115 ppm) | g | 6.81 | 6.81 | 6.81 | 6.81 | 6.81 | 6.81 | 6.81 |
| PA (85% p) | g | N/A | 0.69 | 0.69 | 1.79 | 1.79 | 2.2 | 2.2 |
| Molar ratio (TPT:PA) | — | — | 1:0.25 | 1:0.25 | 1:0.65 | 1:0.65 | 1:0.8 | 1:0.8 |
| IV | dl/g | 0.778 | 0.728 | 0.746 | 0.731 | 0.722 | 0.705 | 0.715 |
| L | CIE | 67.5 | 70.0 | 69.0 | 68.8 | 66.7 | 69.4 | 71.2 |
| a | CIE | −1.80 | −1.70 | −1.50 | −1.60 | −1.20 | −1.50 | −1.60 |
| b | CIE | 2.0 | 2.8 | 2.8 | 3.4 | 4.8 | 3.5 | 2.8 |
| CEG | meq/g | 13.0 | 13.0 | 13.0 | 23.0 | 23.0 | 13.0 | 14.0 |
| Total Esterification time | mm | 625 | 645 | 645 | 650 | 630 | 640 | 640 |
| Esterification end temp | C. | 225 | 225 | 225 | 225 | 225 | 225 | 225 |
| Polymerization cycle time | mm | 200 | 175 | 175 | 172 | 170 | 165 | 170 |
| Polymerization final temp | ° C. | 250 | 250 | 250 | 250 | 250 | 250 | 250 |
| SSP PARAMETER | | | | | | | | |
| SSP PARAMETERS (Batch size) | kg | 7 | 16 | | 15 | | 16 | |
| IV | d/g | 1.192 | 1.212 | | 1.227 | | 1.223 | |
| L* | CIE Lab | 72 | 72 | | 71.45 | | 71.8 | |
| a* | CIE Lab | −1.3 | −1.4 | | −1.1 | | −1.0 | |
| b* | CIE Lab | 4.2 | 4.3 | | 4.8 | | 4.5 | |
| CEG | meq/g | 12 | 11 | | 18 | | 8 | |
| Processing temperature | ° C. | 195 | 200 | | 200 | | 200 | |
| Delta IV Increase | dl/g | 0.414 | 0.475 | | 0.500 | | 0.513 | |
| Residence time at reaction temperature | Hrs | 18 | 20 | | 27 | | 26 | |
| IV build up rate | units/hr | 0.0230 | 0.02375 | | 0.0185 | | 0.0195 | |

TABLE 5

Process Parameters and Results of PBT Resins Prepared in Pilot Plant

| PARAMETER | UNITS | E-13 | E-14 | E-15 | |
|---|---|---|---|---|---|
| Batch weight | Kg | 10 | 10 | 10 | 10 |
| Molar ratio (PET:BDO) | Ratio | 1:3.6 | 1:3.6 | 1:3.6 | 1:3.6 |
| White Flakes/PCR PET CHIPS | Kg | 8.727 | 8.727 | 8.727 | 8.727 |
| MEG FOR DEPOLY | Kg | 4.227 | 4.227 | 4.227 | 4.227 |
| BDO | Kg | 14.727 | 14.727 | 14.727 | 14.727 |
| TPT-CATALYST (115 ppm) | g | 6.81 | 6.81 | 6.81 | 6.81 |
| Phosphoric Acid (85% p) | g | 2.8 | 2.8 | 3.3 | 4.1 |
| Molar ratio (TPT:PA) | — | 1:1.0 | 1:1.0 | 1:1.2 | 1:1.5 |
| IV | dl/g | 0.688 | 0.687 | 0.667 | 0.670 |
| L | CIE | 54.5 | 56.5 | 52.1 | 52.0 |
| a | CIE | 0.50 | −0.40 | 0.70 | 0.90 |
| b | CIE | 5.8 | 6.0 | 3.3 | 4.7 |
| COOH | meq/g | 25.0 | 24.0 | 27.0 | 26.0 |
| Total Esterification time | min | 675 | 680 | 690 | 775 |
| Esterification end temp | C | 225 | 225 | 226 | 225 |
| Poly cycle time | min | 280 | 295 | 310 | 330 |
| Poly final temp | ° C. | 250 | 250 | 250 | 250 |
| SSP PARAMETERS (Batch size) | kg | No Build | No Build | No Build | |
| IV | d/g | | | | |
| L* | CIE Lab | | | | |
| a* | CIE Lab | | | | |
| b* | CIE Lab | | | | |
| Processing temperature | ° C. | | | | |
| Delta IV Increase | dl/g | | | | |
| Residence time at reaction temperature | Hrs | | | | |
| IV build up rate | units/hr | | | | |

D. Hydrostability Studies of Thermoplastic Compositions Containing Modified PBT Prepared According to Part C Because semi-crystalline polyester-polycarbonate blend products are used in outdoor equipment housings as well as in automotive and outdoor vehicles and devices (OVAD), it is important that they are hydrostable. Hydrolysis of PBT-PC blends leads to loss of molecular weight and reduced mechanical performance. The presence of acid in the formulation or even the carboxyl end group of the polyesters can catalyze the degradation of polyesters in the humid environment. Since one of the reaction products of polyester hydrolysis is itself a carboxylic acid, the hydrolytic decomposition of PBT is autocatalytic, as depicted previously in Scheme 1.

The transesterification reaction between polyesters and polycarbonate in the melting state can result in the formation of copolymers, lower heat performance, and slower crystallization. The transesterification reaction is catalyzed by acid, base, and titanium catalyst residues in the polyesters. Quenchers are used as additives to control transesterification in PB-PC blends. Quenchers include "buffered" acid quenchers such as MZP [mono zinc phosphate [$Zn(H_2PO_4)_2$] as well as strong acids such as phosphorous acid ($H_3PO_3$) and phosphoric acid ($H_3PO_4$). Non-acidic quenchers such as TPS [tetrapropoxysilane] have also been used. EP Patent $O_2$ 72417 teaches the use of polyols as catalyst quenchers. Various other polyols $R—(OH)_x$ can also be used to quench titanium, but they lead to polymer degradation and discoloration.

We investigated whether hydrolytic stability could be improved in the PB-PC blends by using PB that is prepared using the new titanium based catalyst as described herein.

Table 6 summarizes the blends that were tested and their mechanical properties. PC-PBT blends were prepared using modified PBT prepared according to the new process described herein. MBS was added as an impact modifier. Phosphorous acid (45% aqueous; loading 0.08 weight percent) was used as a quencher to prevent/control transesterification reaction between PC and PBT. Formulations without quenchers were also prepared.

Mechanical, rheological and thermal properties were listed in Table 7. It can be seen that all the compositions prepared with PBT as described herein with different catalyst ratio showed equivalent mechanical properties with the respect to flexural, impact (both room temperature and low temperature), and tensile properties.

TABLE 6

| Item | Unit | CE-16 | E-17 | E-18 | E-19 | CE-20 | E-21 | E-22 | E-23 |
|---|---|---|---|---|---|---|---|---|---|
| Catalyst Quencher | | Y | Y | Y | Y | N | N | N | N |
| PC-I | % | 37.41 | 37.41 | 37.41 | 37.41 | 37.41 | 37.41 | 37.41 | 37.41 |
| PC-II | % | 19.16 | 19.16 | 19.16 | 19.16 | 19.16 | 19.16 | 19.16 | 19.16 |
| Pentaerythritol betalaurylthiopropionate | % | 0.05 | 0.05 | 0.05 | 0.05 | 0.05 | 0.05 | 0.05 | 0.05 |
| Hindered Phenol Stabilizer | % | 0.08 | 0.08 | 0.08 | 0.08 | 0.08 | 0.08 | 0.08 | 0.08 |
| Phosphorous Acid 45% | % | 0.08 | 0.08 | 0.08 | 0.08 | 0 | 0 | 0 | 0 |
| LLDPE | % | 2 | 2 | 2 | 2 | 2 | 2 | 2 | 2 |
| Global MB | % | 10 | 10 | 10 | 10 | 10 | 10 | 10 | 10 |

TABLE 6-continued

| Item | Unit | CE-16 | E-17 | E-18 | E-19 | CE-20 | E-21 | E-22 | E-23 |
|---|---|---|---|---|---|---|---|---|---|
| PE-I (TPT:PA 1:0) | | 31.22 | 0 | 0 | 0 | 31.22 | 0 | 0 | 0 |
| PE-II (TPT:PA 1:0.25) | | 0 | 31.22 | 0 | 0 | 0 | 31.22 | 0 | 0 |
| PE-II (TPT:PA 1:0.65) | | 0 | 0 | 31.22 | 0 | 0 | 0 | 31.22 | 0 |
| PE-II I (TPT:PA 1:0.8) | | 0 | 0 | 0 | 31.22 | 0 | 0 | 0 | 31.22 |
| Composition Total | | 100 | 100 | 100 | 100 | 100 | 100 | 100 | 100 |

TABLE 7

| Item | Unit | CE-16 | E-17 | E-18 | E-19 | CE-20 | E-21 | E-22 | E-23 |
|---|---|---|---|---|---|---|---|---|---|
| PBT I (TPT:PA 1:0) | | X | — | — | — | X | — | — | — |
| PBT II (TPT:PA 1:0.25) | | — | X | — | — | — | X | — | — |
| PBT II (TPT:PA 1:0.65) | | — | — | X | — | — | — | X | 0 |
| PBT II (TPT:PA 1:0.8) | | — | — | — | X | — | — | — | X |
| Quencher | | Y | Y | Y | Y | N | N | N | N |
| Flexural Modulus | MPa | 2110 | 2080 | 2060 | 2080 | 2080 | 2080 | 2060 | 2130 |
| Flex Stress@5% Strain | MPa | 78 | 77 | 76 | 76 | 75 | 77 | 76 | 78 |
| Notched Izod Ductility, 23° C. | % | 100 | 100 | 100 | 100 | 100 | 100 | 100 | 100 |
| Notched Izod Impact Strength, 23° C. | J/m | 800 | 706 | 702 | 731 | 857 | 753 | 718 | 739 |
| Notched Izod Ductility, −30° C. | % | 100 | 100 | 100 | 100 | 100 | 100 | 100 | 100 |
| Notched Izod Impact Strength, −30° C. | J/m | 646 | 650 | 636 | 650 | 832 | 707 | 661 | 672 |
| Modulus of Elasticity | MPa | 1954 | 1916 | 1930 | 1904 | 1912 | 1916 | 1868 | 1962 |
| Tensile Strength at Yield | MPa | 51 | 50 | 50 | 51 | 51 | 51 | 50 | 52 |
| Tensile Strength at Break | MPa | 47 | 35 | 49 | 51 | 51 | 51 | 50 | 52 |
| % Elongation at Yield | % | 5 | 5 | 5 | 5 | 4 | 4 | 5 | 5 |
| % Elongation at Break | % | 120 | 77 | 142 | 160 | 212 | 171 | 44 | 121 |
| Rheological | | | | | | | | | |
| MVR | cm³/10 min | 19 | 19 | 19 | 21 | 20 | 22 | 20 | 20 |
| MV | Pa-s | 497 | 508 | 508 | 491 | 482 | 475 | 489 | 523 |
| Viscosity Change after "Time Sweep" | % | −21 | −19 | −20 | −19 | −56 | −48 | −28 | −18 |
| PBT I (TPT:PA 1:0) | | X | — | — | — | X | — | — | — |
| PBT II (TPT:PA 1:0.25) | | — | X | — | — | — | X | — | — |
| PBT II (TPT:PA 1:0.65) | | — | — | X | 0 | — | — | X | — |
| PBT II (TPT:PA 1:0.8) | | — | — | — | X | — | — | — | X |
| Thermal | | | | | | | | | |
| Glass Transition Temp (Tg) | ° C. | 120 | 121 | 120 | 121 | — | — | 120 | 120 |
| Onset Melting Temp (Tm) | ° C. | 212 | 212 | 212 | 211 | 212 | 211 | 211 | 210 |
| Heat of Fusion/Melting (delta Hf) | J/g | 19 | 18 | 17 | 17 | 20 | 21 | 18 | 19 |
| Onset Crystallization Temp (Tc) | ° C. | 167 | 168 | 168 | 129 | 72 | 72 | 163 | 160 |
| Heat of Crystallization (delta Hc) | J/g | −15 | −13 | −16 | −8 | −2 | −2 | −15 | −14 |
| Peak Melting Temp (Tpm) | ° C. | 211 | 212 | 211 | 210 | 208 | 206 | 210 | 209 |
| Deflection temp | ° C. | 83 | 84 | 84 | 83 | 71 | 78 | 80 | 80 |
| VST After Regular Molding | ° C. | 142 | 145 | 145 | 83 | 121 | 132 | 142 | 140 |
| VST After Abusive Molding | ° C. | 128 | 138 | 142 | 143 | 91 | 93 | 120 | 133 |
| Delta Vicat softening temperature | % | 16 | 7 | 3 | 3 | 30 | 40 | 22 | 7 |

The impact strength, % elongation at break, and ductility retention after hydro-aging under 80° C. and 80% relative humidity is reported in Table 8 and FIG. 1. CE-16 (with quencher), E-17 (with quencher), E-18 (with quencher), and E-19 (with quencher) almost completely lost their ductility and % elongation at break after 1000 hr hydroaging. CE-16 (with quencher) started losing its ductility even after 750 hr. CE-20 (w/o quencher), 21-6 (w/o quencher), E-22 (w/o quencher), and E-23 (w/o quencher), maintained their ductility 100%. From the delta VST data, we deduced that CE-20 (w/o quencher), E-21 (w/o quencher), and E-22 (w/o quencher) were susceptible to transesterification reaction between modified PBT and the PC phases, which gave rise to a polyestercarbonate backbone structure which maintained ductility after longer hours of hydroaging. E-23 (w/o quencher) maintained 100% ductility after 1000 hydroaging while keeping the compound morphology same, free from hydrolysis and transesterification reactions. The control sample CE-16 (with quencher) lost 82% percent of its notched impact strength after 1000 hr of hydroaging. Other samples prepared with the new catalyst lost their notched impact strength between 55% and 75% in the presence of the catalyst quencher. As the ratio of phosphoric acid increases in the new catalyst, the loss of notched impact strength increases. Since CE-20, E-21, and E-22 gave extensive transesterification, we did not take into consideration in terms of retention impact strength. E-23 (w/o quencher) maintained 100% of its notched izod impact strength after 1000 hours indicating that this formulation shows best in class hydrostability compare to other Xenoy grades in Sabic portfolio. E-23 (w/o quencher) maintained its % elongation at break 12% after 1000 hr aging compared to CE-16.

The foregoing disclosure has been described in some detail by way of illustration and example for purposes of clarity and understanding. The invention has been described with reference to various specific and preferred embodiments and techniques. However, it should be understood that many variations and modifications can be made while remaining within the spirit and scope of the invention. It will be obvious to one of skill in the art that changes and modifications can be practiced within the scope of the appended claims. Therefore, it is to be understood that the above description is intended to be illustrative and not restrictive. The scope of the invention should, therefore, be determined not with reference to the above description, but should instead be determined with reference to the following appended claims, along with the full scope of equivalents to which such claims are entitled.

The invention claimed is:
1. A compounded thermoplastic composition with improved hydrostability, comprising:
- 31.2 percent by weight of a modified polybutylene terephthalate, wherein the modified polybutylene terephthalate contains phosphoric acid (PA) and 115 ppm of tetraisopropyl titanate (TPT), wherein the molar ratio of TPT to PA (TPT:PA) is 1:0.8;
- 56.6 percent by weight of a bisphenol A polycarbonate;
- 2 percent by weight of linear low density polyethylene;
- 10 percent by weight of methylmethacrylate-butadiene styrene;
- 0.05 percent by weight of pentaerythritol betalaurylthiopropionate; and
- 0.08 percent by weight of pentaerythritol-tetrakis(3-(3,5-di-tert-butyl-4-hydroxy-phenyl-) propionate);
- wherein all weight percents are based on the total weight of the compounded thermoplastic composition;
- the composition is free of transesterification between the polybutylene terephthalate and bisphenol A polycarbonate;

TABLE 8

|  | Unit | CE-16 | E-17 | E-18 | E-19 | CE-20 | E-21 | E-22 | E-23 |
|---|---|---|---|---|---|---|---|---|---|
| PBT I (TPT:PA 1:0) |  | X | — | — | — | X | — | — | — |
| PBT II (TPT:PA 1:0.25) |  | — | X | — | — | — | X | — | — |
| PBT II (TPT:PA 1:0.65) |  | — | — | X | 0 | 0 | 0 | X | — |
| PBT II (TPT:PA 1:0.8) |  | — | — | — | X | — | — | — | X |
| Ductility |  |  |  |  |  |  |  |  |  |
| T = 0 | % | 100 | 100 | 100 | 100 | 100 | 100 | 100 | 100 |
| T = 500 hr | % | 100 | 100 | 100 | 100 | 100 | 100 | 100 | 100 |
| T = 750 hr | % | 33.3 | 100 | 100 | 100 | 100 | 100 | 100 | 100 |
| T = 1000 hr | % | 0 | 25 | 0 | 0 | 100 | 100 | 100 | 100 |
| Notched Impact Strength | J/m |  |  |  |  |  |  |  |  |
| T = 0 | J/m | 2140 | 2140 | 2140 | 2130 | 2140 | 2110 | 2140 | 2140 |
| T = 500 hr | J/m | 1440 | 2140 | 2140 | 1650 | 2140 | 2140 | 2140 | 2140 |
| T = 750 hr | J/m | 988 | 1350 | 1390 | 1060 | 2140 | 2140 | 2140 | 2140 |
| T = 1000 hr | J/m | 384 | 976 | 609 | 512 | 2140 | 2100 | 1700 | 2140 |
| % Elongation at Break-Avg | J/m |  |  |  |  |  |  |  |  |
| T = 0 | J/m | 120 | 77 | 142 | 160 | 212 | 171 | 44 | 121 |
| T = 500 hr | J/m | 9 | 10 | 15 | 10 | 138 | 31 | 40 | 14 |
| T = 750 hr | J/m | 3 | 11 | 9 | 3 | 72 | 17 | 19 | 20 |
| T = 1000 hr | J/m | 3 | 3 | 2 | 1 | 49 | 8 | 14 | 14 | no quencher for the catalyst complex is added to the compounded thermoplastic composition; and the notched impact strength is maintained at 100 percent after 1000 hours of hydroaging at 80° C. and 80% relative humidity when measured according to ASTM method D256.

\* \* \* \* \*